(12) United States Patent
Song

(10) Patent No.: US 10,392,258 B2
(45) Date of Patent: Aug. 27, 2019

(54) METHOD OF PRODUCING HIGH-PURITY LITHIUM CARBONATE AND BARIUM SULFATE FROM DISCARDED LITHIUM SECONDARY BATTERIES

(71) Applicant: KANGWON NATIONAL UNIVERSITY University-Industry Cooperation Foundation, Gangwon-do (KR)

(72) Inventor: Young Jun Song, Gangwon-do (KR)

(73) Assignee: KANGWON NATIONAL UNIVERSITY University-Industry Cooperation Foundation, Gangwon-Do (KR)

(*) Notice: Subject to any disclaimer, the term of this patent is extended or adjusted under 35 U.S.C. 154(b) by 0 days.

(21) Appl. No.: 15/991,388

(22) Filed: May 29, 2018

(65) Prior Publication Data
US 2019/0144294 A1   May 16, 2019

(30) Foreign Application Priority Data
Nov. 14, 2017   (KR) .......... 10-2017-0151324

(51) Int. Cl.
| | | |
|---|---|---|
| *C01D 15/00* | (2006.01) | |
| *C01D 15/08* | (2006.01) | |
| *C01D 5/04* | (2006.01) | |
| *C01D 7/02* | (2006.01) | |
| *C01D 7/38* | (2006.01) | |
| *H01M 10/54* | (2006.01) | |
| *C01D 7/26* | (2006.01) | |

(52) U.S. Cl.
CPC ............ *C01D 15/08* (2013.01); *C01D 5/04* (2013.01); *C01D 7/02* (2013.01); *C01D 7/26* (2013.01); *C01D 7/38* (2013.01); *H01M 10/54* (2013.01); *C01P 2004/64* (2013.01); *C01P 2006/80* (2013.01)

(58) Field of Classification Search
CPC ...... C01B 25/222; C01D 15/00; C01D 15/06; C01D 15/08; C01F 11/462
USPC .................. 423/179.5, 421, 166, 554
See application file for complete search history.

(56) References Cited

U.S. PATENT DOCUMENTS

| | | | | |
|---|---|---|---|---|
| 6,207,126 B1* | 3/2001 | Boryta | .................. | C01D 15/04 423/158 |
| 2012/0189516 A1* | 7/2012 | Donaldson | ............... | C01D 3/08 423/179.5 |
| 2016/0104886 A1* | 4/2016 | Tsunozaki | ............ | H01M 4/505 29/623.1 |

FOREIGN PATENT DOCUMENTS

| | | |
|---|---|---|
| JP | 2009046390 A | 3/2009 |
| KR | 10-2010-0074105 A | 7/2010 |
| KR | 10-1604954 B1 | 3/2016 |
| KR | 101773439 B1 | 9/2017 |

* cited by examiner

*Primary Examiner* — Steven J Bos
(74) *Attorney, Agent, or Firm* — Harness, Dickey & Pierce, P.L.C.

(57) ABSTRACT

Disclosed is a method of producing high-purity lithium carbonate and barium sulfate from discarded lithium secondary batteries, including: a first process for producing high-purity lithium phosphate from a discarded battery; and a second process for producing lithium sulfate from the lithium phosphate and producing lithium carbonate and barium sulfate from the lithium sulfate. The second process has steps of (a) producing a liquid mixture of lithium phosphate and sulfuric acid, (b) obtaining lithium sulfate by condensing the liquid mixture, (c) dissolving the lithium sulfate in water or a sodium hydroxide aqueous solution, depositing phosphoric acid as lithium phosphate, and performing solid-liquid separation (d) depositing lithium carbonate and performing solid-liquid separation to obtain lithium carbonate, (e) finely grinding the lithium carbonate and classifying the particles, (f) controlling a particle size and shape by dissolving edges of particles or minute particles, (g) performing solid-liquid separation, and (h) depositing barium sulfate.

11 Claims, 15 Drawing Sheets

METHOD OF PRODUCING HIGH-PURITY LITHIUM CARBONATE AND BARIUM SULFATE FROM DISCARDED LITHIUM SECONDARY BATTERIES

CROSS REFERENCES TO RELATED APPLICATIONS

The present application claims priority to Korean Patent Application No. 10-2017-0151324, filed in the Korean Patent Office on Nov. 14, 2017, the entire contents of which are incorporated herein by reference.

FIELD

The present invention relates to a method of producing high-purity lithium carbonate and barium sulfate from discarded lithium secondary batteries.

BACKGROUND

South Korea is known as a nation capable of producing a mass amount of lithium secondary batteries, and occupies 40% of the worldwide production capacity of the cathode active materials for secondary batteries. Therefore, South Korea imports about 15,000 tons of lithium carbonate to produce the cathode active materials. A process of recycling discarded lithium secondary batteries is classified into a dry process and a wet process. In the dry process, discarded lithium secondary batteries are introduced into a high-temperature furnace to recover metals, which is relatively simple. However, the dry process is expensive in terms of initial investment cost. In addition, a metal recovery rate is poor, and gas treatment cost is high disadvantageously. In comparison, in the wet process, discarded lithium secondary batteries are dissolved in sulfuric acid, and metals are extracted using a solvent extraction method. The wet process is advantageous in terms of an inexpensive initial cost, a high metal recovery rate, and a high purity. However, a cost for treating a waste liquid of the solvent extraction is expensive disadvantageously.

In South Korea, the amount of discarded lithium secondary batteries is estimated to about 20,000 tons per year. Out of this amount, it is known that about 3,000 tons of metal scraps are generated in the process of recovering metals from the discarded lithium secondary batteries. The process of recovering metals from discarded lithium secondary batteries is mainly a solvent extraction process for recovering cobalt and nickel from discarded cathode active materials. Through the solvent extraction process, a manganese sulfate waste liquid and a lithium sulfate waste liquid are generated abundantly. Since the manganese sulfate waste liquid and the lithium sulfate waste liquid are heavy metals, an unfiltered discharge to the nature is inhibited. In this regard, a purification process or a strategy for extracting useful metals from the waste liquid has been studied in the art.

An annual metal recovery capacity of the main domestic discarded lithium secondary battery recycling companies is estimated to 12,000 tons per year. Assuming that the factories are fully operated, 12,000 tons of the manganese sulfate waste liquids and 180,000 tons of lithium sulfate waste liquids are generated. It is predicted that the metal recovery facilities will be established more and more, and the waste liquid amount also increases in the future as the domestic use amount of the discarded lithium secondary batteries increases in South Korea.

The amount of the lithium sulfate waste liquid is abundant, and a lithium concentration of the lithium sulfate waste liquid is very high (approximately 3,000 ppm). Therefore, development of a lithium recovery technology is highly demanded. However, existing methods using a series of processes including (absorption)-(descorptive condensation)-(solvent extraction or evaporative condensation)-(solvent extraction) are expensive (about $5/ton in the case of lithium carbonate). This makes it difficult to apply the existing methods. Therefore, there is an urgent demand for a technology that enables production of lithium carbonate with an inexpensive treatment cost relative to the existing processes.

The patent documents and references cited herein are hereby incorporated by reference to the same extent as if each reference is individually and clearly identified.

CITATION LIST

Patent Literature

Patent Literature 1: Korean Patent No. 10-1604954

SUMMARY

An object of the present invention is to provide a method of producing high-purity lithium carbonate and barium sulfate with a lower treatment cost from discarded lithium secondary batteries whose consumption is increasing.

Other objects and technical features of the present invention will be more specifically shown by the following detailed description of the invention, claims, and drawings.

According to an aspect of the invention, there is provided a method of producing high-purity lithium carbonate and barium sulfate from discarded lithium secondary batteries with an inexpensive process cost. In this method, high-purity lithium phosphate is produced from discarded lithium secondary batteries, and lithium sulfate is produced from the high-purity lithium phosphate. Then, high-purity lithium carbonate and barium sulfate are produced from the lithium sulfate.

The method of producing lithium sulfate from the high-purity lithium phosphate includes steps of (a) producing a liquid mixture of lithium phosphate and sulfuric acid by mixing high-purity lithium phosphate and a sulfuric acid aqueous solution, (b) obtaining high-purity lithium sulfate having a solid phase by condensing the liquid mixture of lithium phosphate and sulfuric acid and performing solid-liquid separation, (c) dissolving the high-purity lithium sulfate in water or a sodium hydroxide aqueous solution, depositing remaining phosphoric acid as lithium phosphate by maintaining a pH value of the lithium sulfate aqueous solution at 12 or higher, and performing solid-liquid separation to obtain lithium sulfate aqueous solution by removing a phosphoric component, (d) depositing lithium carbonate by adding carbonate (or its aqueous solution), or a carbonic acid gas to the lithium sulfate aqueous solution and performing solid-liquid separation to obtain lithium carbonate, (e) grinding the obtained lithium carbonate and classifying lithium carbonate particles, (f) controlling a particle size and a particle shape by blowing a carbonic acid gas to the lithium carbonate slurry containing lithium carbonate particles having a size equal to or smaller than 5 μm and dissolving edges of lithium carbonate particles or dissolving and removing minute particles, (g) performing solid-liquid separation for the lithium carbonate slurry obtained by controlling the particle size, and (h) depositing barium sulfate by adding a soluble barium salt aqueous solution to a filtrate obtained from the solid-liquid separation and performing solid-liquid separation.

In the method of producing high-purity lithium carbonate from the lithium sulfate according to the invention, the aqueous solution obtained after the reaction of step (c) has a pH value of 12 or higher, and the reaction is generated at a temperature of 50° C. for 20 minutes to 2 hours. Then, solid-liquid separation is performed. The obtained lithium phosphate is used as a source material in step (a). In step (d), the lithium sulfate aqueous solution has a concentration of 0.3 to 2.4 M, and sodium carbonate or sodium hydroxide and a carbonic acid gas are added as much as the same equivalent, and the reaction is generated at a temperature 30° C. for 20 minutes to 2 hours. Then, solid-liquid separation is performed. In step (h), the amount of the added soluble barium salt aqueous solution is set to an equivalent weight 0.5 to 1.1 times of a total amount of the sulfuric acid ions to be removed.

The present invention provides a method of producing high-purity lithium carbonate and barium sulfate from discarded lithium secondary batteries.

In the method of producing high-purity lithium carbonate, high-purity lithium phosphate is produced from a discarded lithium secondary battery waste liquid. Lithium sulfate is produced from the lithium phosphate. In addition, the high-purity lithium carbonate is produced from the lithium sulfate. Therefore, 85% to 90% of the lithium contained in the discarded lithium secondary battery waste liquid can be recovered in the form of lithium carbonate.

The lithium carbonate according to the invention has a purity of 99.5% with a little amount of impurities such as phosphor (0.005% to 0.006%), sulfur (0.2% to 0.3%), and sodium (0.1% to 0.2%). In addition, the lithium carbonate has a particle size of 1 to 5 μm and a wide specific surface area, and the particle shapes are round and uniform. Therefore, it is possible to provide high-purity lithium carbonate having excellent reactivity.

In the method according to the invention, since heating or condensation is not performed for solid-liquid separation, an expensive machine or facility and its maintenance cost are not necessary. In addition, a significant amount of source materials necessary in the reaction are obtained by recycling substances generated in the processes of this method. Therefore, the method of the invention is economically advantageous, compared to the prior art.

BRIEF DESCRIPTION OF THE DRAWINGS

The foregoing and additional features and characteristics of this disclosure will become more apparent from the following detailed description considered with reference to the accompanying drawings, wherein:

FIGS. 5A and 5B are SEM photographs of lithium carbonate produced from lithium sulfate obtained from discarded lithium secondary batteries, in which FIG. 5A illustrates a series of SEM photographs of the produced lithium carbonate (before grinding and washing) taken by increasing a graphic resolution to ×100, ×500, ×1000, ×5000, and ×10000, and FIG. 5B illustrates a series of SEM photographs of lithium carbonate before grinding and washing and a series of SEM photographs of lithium carbonate after grinding and washing;

FIGS. 9A, 9B and 9C illustrate production of lithium phosphate depending on a temperature, in which FIG. 9A illustrates a change of a reaction rate of a lithium phosphate production reaction depending on temperature, FIG. 9B are SEM photographs for showing a change of the reaction rate of lithium phosphate depending on a temperature, and FIG. 9C illustrates a change of a concentration of lithium ions depending on a reaction time.

DETAILED DESCRIPTION

Figure 1A:
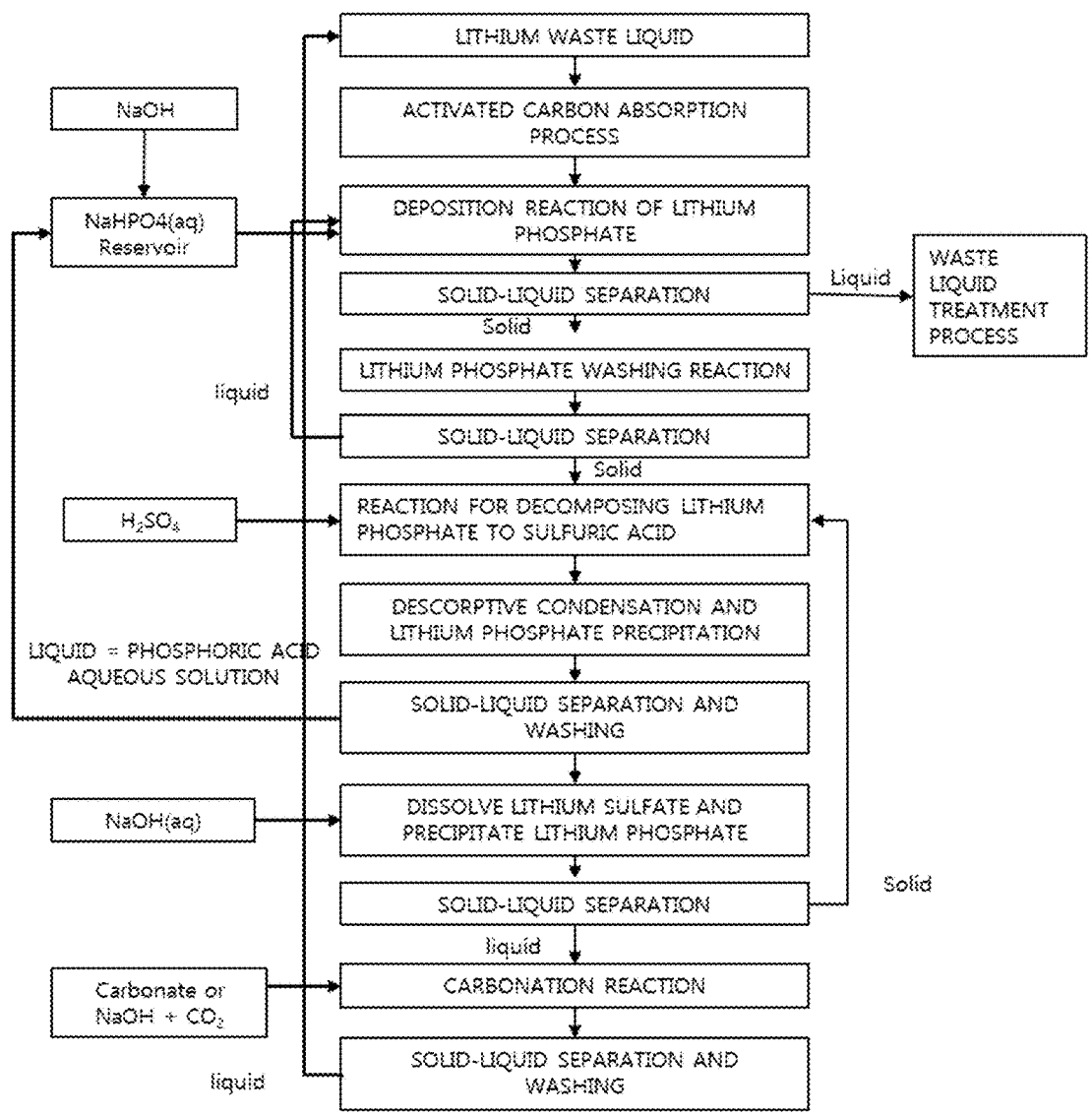
FIGS. 1A and 1B illustrates a process of producing high-purity lithium carbonate and barium sulfate from a lithium waste liquid of discarded lithium secondary batteries by controlling a particle size.

A method of producing high-purity lithium carbonate and barium sulfate from discarded lithium secondary batteries includes a first process for producing high-purity lithium phosphate from discarded lithium secondary batteries, and a second process for producing high-purity lithium sulfate from the high-purity lithium phosphate and producing high-purity lithium carbonate and barium sulfate from the high-purity lithium sulfate.

The first process for producing high-purity lithium phosphate from discarded lithium secondary batteries includes steps of: (i) removing an organic substance by passing a discarded lithium secondary battery waste liquid through activated carbon; (j) measuring a concentration of lithium ions contained in the discarded lithium secondary battery waste liquid subjected to the removal of organic substances and adding soluble phosphate including $Na_3PO_4$, $Na_2HPO_4$, $NaH_2PO_4$, $K_3PO_4$, or $H_3PO_4$ or an aqueous solution of the soluble phosphate to the lithium waste liquid as much as an equivalent weight twice that of a concentration of lithium contained in the lithium waste liquid to produce a lithium phosphate waste liquid; (k) adding a pH conditioner containing NaOH or KOH to the phosphate-lithium waste liquid to maintain a pH value to 13 or higher, generating reaction at a temperature of 70° C. for 60 minutes, performing solid-liquid separation to produce low-purity lithium phosphate precipitated in a solid phase; (l) adding water to the low-purity lithium phosphate as much as 10 parts by weight and adding an acid including $H_3PO_4$, $H_2CO_3$, $H_2SO_4$, $HNO_3$, or HCl or an aqueous solution of the acid to produce a matured lithium phosphate liquid having a pH value of 10; (m) maturing the lithium phosphate by agitating the matured lithium phosphate liquid at the room temperature for 30 minutes or longer; (n) adding a lithium hydroxide aqueous solution to the matured lithium phosphate liquid as much as an equivalent weight of the acid dosage to produce a lithium phosphate precipitation solution having a pH value of 13; and (o) agitating the lithium phosphate precipitation solution at a temperature of 70° C. for 60 minutes or longer to obtain high-purity lithium phosphate.

The first process for producing high-purity lithium phosphate from discarded lithium secondary batteries is already known in the art as discussed in Korean Patent No. 10-1604954, assigned to the applicant.

The high-purity lithium phosphate is further purified by decomposing a discarded lithium secondary battery, producing lithium phosphate by adding a phosphoric acid aqueous solution and a lithium hydroxide aqueous solution, and maturing the produced lithium phosphate. The high-purity lithium phosphate is obtained by further adding a phosphoric acid aqueous solution and a lithium hydroxide aqueous solution to the lithium phosphate produced primarily by adding the phosphoric acid aqueous solution and generating reaction to induce recombination of lithium phosphate and extracting impurities to the solution during the recombination process.

According to the present invention, a technology of producing high-purity lithium carbonate and barium sulfate is provided in addition to the first process. A sediment or solution generated in the process of producing the high-purity lithium carbonate and barium sulfate (second process) participates in the first process to improve production efficiency and reduce a unnecessary waste liquid advantageously.

The second process for producing high-purity lithium sulfate from the high-purity lithium phosphate and producing high-purity lithium carbonate and barium sulfate from the high-purity lithium sulfate includes steps of: (a) mixing high-purity lithium phosphate with a sulfuric acid aqueous solution to produce a lithium phosphate-sulfuric acid liquid mixture; (b) condensing the lithium phosphate-sulfuric acid liquid mixture and performing solid-liquid separation to obtain high-purity lithium sulfate; (c) dissolving the high-purity lithium sulfate in water or a sodium hydroxide aqueous solution, depositing remaining phosphoric acid as lithium phosphate while maintaining a pH value of the lithium sulfate aqueous solution at 12 or higher, and performing solid-liquid separation to obtain a lithium sulfate aqueous solution by removing a phosphorous component; (d) adding carbonate, a carbonate aqueous solution, or a carbonic acid gas, depositing lithium carbonate, and performing solid-liquid separation to obtain lithium carbonate having a solid phase; (e) grinding the obtained solid-phase lithium carbonate and classifying lithium carbonate particles having a particle size of 1 to 5 μm to produce lithium carbonate slurry; (f) controlling a particle size and a particle shape of lithium carbonate by blowing a carbonic acid gas to the lithium carbonate slurry to dissolve edges of the lithium carbonate particles or dissolve and removing fine particles of lithium carbonate; (g) obtaining lithium carbonate particles having the controlled particle size and a particle shape in a solid phase by performing solid-liquid separation for the lithium carbonate slurry obtained by blowing the carbonic acid gas; and (h) adding a soluble barium salt aqueous solution to a filtrate obtained through the solid-liquid separation of step (g), depositing barium sulfate, and performing solid-liquid separation to obtain high-purity barium sulfate having a solid phase.

The second process can be classified into a process of producing high-purity lithium sulfate from the high-purity lithium phosphate and a process of producing high-purity lithium carbonate and barium sulfate from the high-purity lithium sulfate.

The process of producing high-purity lithium sulfate from the high-purity lithium phosphate includes the steps (a) and (b). The process of producing high-purity lithium carbonate and barium sulfate from the high-purity lithium sulfate includes the steps (c) to (h).

The filtrate obtained from the solid-liquid separation of the step (b) is mixed with sodium hydroxide and is used in production of the lithium phosphate waste liquid of the first process. The filtrate is a phosphoric acid aqueous solution and is used in production of lithium phosphate waste liquid of the first process and deposition of low-purity lithium phosphate. For this purpose, the filtrate is stored in a sodium phosphate aqueous solution reservoir and reacts with sodium hydroxide in the reservoir, so that it exists as soluble phosphate such as $Na_3PO_4$, $Na_2HPO_4$, $NaH_2PO_4$, $K_3PO_4$, or $H_3PO_4$ or an aqueous solution of the soluble phosphate used in deposition of the low-purity lithium phosphate.

The solid-phase lithium phosphate obtained through the solid-liquid separation of the step (c) is used in production of the lithium phosphate-sulfuric acid liquid mixture of the step (a). The lithium phosphate is mixed with the sulfuric acid aqueous solution in the step (a) and is decomposed.

The lithium carbonate particles having a size larger than 5 μm in the classification of the step (e) are further grinded repeatedly until the size becomes 1 to 5 μm. The filtrate obtained through the solid-liquid separation of the step (h) is added to the fine grinding of the step (e) and is used in production of the lithium carbonate slurry.

If lithium phosphate and the sulfuric acid aqueous solution are mixed in the process of producing high-purity lithium sulfate from the high-purity lithium phosphate, the lithium phosphate is decomposed by sulfuric acid, and lithium sulfate (Li2SO4) is precipitated as solids as expressed in the following Chemical Formula 1. In addition, lithium, sulfuric acid, and phosphoric acid remain in a liquid phase (step (a)).

$$2Li_3PO_4 + 3H_2SO_4 \rightarrow 2H_3PO_4 + 3Li_2SO_4 \qquad \text{[Chemical Formula 1]}$$

In the reaction of the sulfuric acid, 1.3 to 1.4 parts by weight of sulfuric acid (1:1) is added to 1 parts by weight of lithium phosphate slurry having a solid content concentration of about 50%, and the lithium phosphate is perfectly dissolved through agitation. In this case, the temperature of the reaction liquid becomes 30 to 50° C. due to heat of neutralization. Therefore, separate cooling or heating is not necessary.

A condensation and solid-liquid separation process may be repeatedly applied in order to recover remaining sulfuric acid and lithium contained in the liquid separated through the solid-liquid separation (step (b)).

If concentrations of the sulfuric acid and the lithium contained in the liquid increase through the condensation, they are precipitated as lithium sulfate. Therefore, the lithium sulfate can be separated through solid-liquid separation and may be used to produce lithium carbonate. In addition, the liquid subjected to recovery of lithium sulfate contains phosphoric acid as a main component and also contains a small amount of sulfuric acid ions and lithium ions. Sodium hydroxide (NaOH) is added to the phosphoric acid contained in the solution as much as an equivalent weight or more to set a pH value to 13 or higher, and this may be used as a source material of the lithium phosphate recovery process. The waste liquid of the lithium phosphate recovery process contains phosphoric acid. Therefore, in order to externally discharge it after removing phosphoric acid, the phosphoric acid is removed by applying the waste liquid to an insoluble phosphate production process including a calcium hydroxide reaction, a carbon dioxide (carbon acid gas) reaction, an aluminum sulfate reaction, and solid-liquid separation. Then, the resulting liquid may be externally discharged.

Production of high-purity lithium carbonate from high-purity lithium sulfate includes steps of: (c) dissolving lithium sulfate in water or a sodium hydroxide aqueous solution, depositing remaining phosphoric acid as lithium phosphate while maintaining a pH value of the solution at 12 or higher, and obtaining a lithium sulfate aqueous solution in which a phosphoric component is removed through solid-liquid separation; (d) adding carbonate (or its aqueous solution) or a carbonate gas to this aqueous solution, depositing lithium carbonate, performing solid-liquid separation to obtain lithium carbonate; (e) finely grinding the obtained solid-phase lithium carbonate and classifying lithium carbonate particles having a particle size of 1 to 5 μm to produce lithium carbonate slurry; (f) controlling a particle size and a particle shape of the lithium carbonate by blowing a carbonic acid gas to the lithium carbonate slurry to dissolve edges of the lithium carbonate particles or dissolve and remove lithium carbonate fine particles; (g) performing solid-liquid separation for the lithium carbonate slurry obtained by blowing the carbonic acid gas to obtain lithium carbonate particles having a solid phase by controlling a particle size and a particle shape; and (h) adding a soluble barium salt aqueous solution to the filtrate obtained through the solid-liquid separation of the step (g), depositing barium sulfate, and performing solid-liquid separation to obtain high-purity barium sulfate having a solid phase.

The lithium sulfate produced from the lithium phosphate produced from discarded lithium secondary batteries is dissolved in water to produce a lithium sulfate aqueous solution, and lithium sulfate aqueous solution is obtained by controlling a pH value to 12 to 13 using sodium hydroxide.

The pH value of the lithium sulfate aqueous solution is maintained at 12 or higher using a sodium hydroxide aqueous solution or the like, and the concentration of the lithium sulfate is adjusted to 0.3 to 2.4 M. Then, reaction is performed at a temperature of 50° C. or higher for 20 minutes to 2 hours, and solid-liquid separation is performed. As a result, a lithium sulfate aqueous solution having no phosphoric acid component is obtained. The lithium phosphate obtained at the same time as a solid phase is used as a source material in Step (a).

The aforementioned pH adjustment is an important factor for determining efficiency of the carbonation reaction using sodium bicarbonate, sodium carbonate, or a carbonic acid gas. Efficiency of the carbonation reaction using the carbonic acid gas is degraded if the pH value of the reaction liquid is equal to or lower than 9. Therefore, the pH value of the lithium sulfate aqueous solution is adjusted to 9 or higher, preferably 12 to 13, and most preferably, 13. In this case, if an aqueous solution having a sodium hydroxide (NaOH) concentration of 0.1 N is used, or if lithium sulfate is perfectly dissolved first in water, and NaOH or its aqueous solution of 0.1 N is added, most of the phosphoric acid components contained in the lithium sulfate are deposited as lithium phosphate. In this case, as a temperature increases, the reaction rate increases. Therefore, the temperature is preferably set to 80 to 100° C. In the carbonation method of the prior art, the pH conditioner is not employed, and sodium bicarbonate or sodium carbonate is directly applied. If sodium bicarbonate or sodium carbonate is used as the pH conditioner, it is possible to perform a carbonation reaction without additionally performing pH adjustment. However, if the sulfuric acid concentration is high, a liquid-liquid reaction occurs between the lithium sulfate aqueous solution and the sodium carbonate aqueous solution (sodium bicarbonate aqueous solution) to form floc. Since this floc contains lithium carbonate formed through carbonation, the amount of lithium carbonate produced finally is reduced disadvantageously.

According to the invention, the sodium hydroxide serves as a pH conditioner for changing only the pH value without generating a liquid-liquid reaction with the lithium sulfate aqueous solution. Therefore, advantageously, no floc is formed in the lithium carbonate production process according to the invention. If the pH value of the lithium sulfate aqueous solution increases to 12 to 13 pH by using sodium hydroxide as in the present invention, the lithium phosphate contained in the lithium sulfate aqueous solution is also precipitated. The precipitated lithium phosphate is separated through solid-liquid separation, and may be then used to produce lithium sulfate along with the lithium phosphate produced from discarded lithium secondary batteries.

Lithium carbonate is deposited by adding carbonates (or its aqueous solution) or a carbonic acid gas to the lithium sulfate aqueous solution, and lithium carbonate is obtained by performing solid-liquid separation for the deposited lithium carbonate (Step (d)).

Carbonation is performed for the lithium sulfate aqueous solution obtained by adjusting the pH value to 12 to 13 and removing remaining lithium phosphate through the solid-liquid separation. Sodium bicarbonate, sodium carbonate, or a carbonic acid gas may be used in the carbonation reaction. If carbonation is performed using the sodium bicarbonate or the sodium carbonate, lithium sulfate (Li2SO4) is decomposed to lithium carbonate (Li2CO3) and sodium sulfide (Na2SO4) as expressed in the following Chemical Formula 2, and the lithium carbonate deposited through the solid-liquid separation can be obtained in a solid phase while the sodium sulfide remains in a liquid phase.

$$Li_3SO_4+Na_2CO_3 \rightarrow Li_2CO_3+Na_2SO_4 \quad \text{[Chemical Formula 2]}$$

If carbonation is performed using the carbonic acid gas by adjusting the pH value of sodium hydroxide as in the present invention, lithium sulfate is decomposed into sodium carbonate and sodium sulfide as expressed in the following Chemical Formula 3. In addition, the sodium carbonate obtained as described above may be converted into sodium bicarbonate again as expressed in the following Chemical Formula 4.

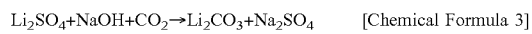
$$Li_2SO_4+NaOH+CO_2 \rightarrow Li_2CO_3+Na_2SO_4 \quad \text{[Chemical Formula 3]}$$

$$Li_2CO_3+H_2O+CO_2 \rightleftarrows 2LiHCO_3 \quad \text{[Chemical Formula 4]}$$

Specifically, a concentration of the lithium sulfate aqueous solution is set to 0.3 to 2.4 M, and a sodium carbonate aqueous solution having the same equivalent weight is reacted. Alternatively, a sodium hydroxide aqueous solution having the same equivalent weight is mixed, and a carbonic acid gas (carbon dioxide) is added. Then, reaction is generated at a temperature of 30° C. or higher for 20 minutes to 2 hours, and solid-liquid separation is performed. In a case where the sodium carbonate aqueous solution is added, lithium carbonate particles having relatively small absorption amounts of sulfuric acid ions and sodium ions can be obtained by adding sodium carbonate particles while controlling a particle size and purity to the lithium sulfate aqueous solution in advance and the slowly adding a sodium carbonate aqueous solution for one hour. The sodium bicarbonate and the sodium carbonate may form flocs through the liquid-liquid reaction with the lithium sulfate aqueous solution. Therefore, carbonation efficiency can be improved by using the carbonic acid gas that does not form floc. In a case where the carbonic acid gas is supplied, the lithium carbonate purity increases relative to a case where sodium carbonate is used. The injection rate of the carbonic acid gas is preferably set to 300 to 1,000 ml/min. If carbonation is performed using the carbonic acid gas, the pH value decreases, and efficiency of the carbonation reaction also decreases. Therefore, considering a carbonation level and pH reduction, the carbonic acid gas is preferably injected within 30 minutes, so as to stop the carbonation reaction at the pH atmosphere of 9 to 10.

The lithium carbonate produced through the aforementioned carbonation has a purity higher than those of the prior art while preventing flocs. However, it is necessary to further remove an impurity precipitated during the carbonation or attached to a surface of the lithium carbonate. In addition, as a particle size of the lithium carbonate is reduced, a specific surface area increases, so that reactivity can be improved.

Therefore, according to the present invention, fine grinding and classification were performed for the produced lithium carbonate, and impurities attached to the surface of lithium carbonate were physically removed, so that only lithium carbonate particles having a particle size of 1 to 5 μm were obtained through classification. During the classification process, fine grinding was additionally performed for the lithium carbonate particles having a particle size of 5 μm or larger until the size becomes 1 to 5 μm. Physical grinding using an attrition mill may be employed in the fine grinding. For the fine grinding using the attrition mill, the lithium carbonate having a solid phase was grinded using the attrition mill in a slurry state. For production of the slurry, the filtrate obtained after the solid-liquid separation for the precipitated barium sulfate (step h)) may be used.

The solid content of the lithium carbonate slurry has a concentration of 10 to 20%, and the employed aqueous solution is the lithium bicarbonate saturation solution obtained in the step (h). Sulfuric acid ions and sodium ions captured in lithium carbonate crystals are escaped from the crystals during the grinding process, and are dispersed into the aqueous solution. In order to minimize absorption (maximize diffusion) of sulfuric acid ions and sodium ions during the grinding, the temperature of the slurry is set to 50 to 80° C., and the grinding bowl and the grinding media are preferably formed of a zirconia material in order to prevent contamination and improve grinding efficiency. Classification is performed using a wet cyclone machine, a micro filter, or the like. The particles having a size of 5 μm or larger out of the classified particles are returned to the grinding machine and are re-grinded (step (e)).

According to an embodiment of the invention, the grinding was performed using the attrition mill, and washing was performed. As a result, it was observed that the particle size of the lithium carbonate is reduced by 90% or more, and the content of the impurity such as phosphor and sodium is reduced to ⅙ or less.

The classification is a process of screening only lithium carbonate particles having a maximum size of 5 μm. Therefore, the resulting particles may contain fine lithium carbonate particles having a size of 1 μm or smaller in addition to the lithium carbonate particles having a particle size of 1 to 5 μm. The fine lithium carbonate particles having a size of 1 μm or smaller have excessively high reactivity, so that they may be flocculated with the classified lithium carbonate particles, and may increase the particle size and degrade uniformity of particles. In addition, the lithium carbonate particles finely grinded through the aforementioned physical method have random shapes. Therefore, while the specific surface area increases, improvement of reactivity may be negligible in some cases.

Therefore, according to the present invention, additional carbonation is performed for the lithium carbonate particles classified through physical fine grinding, so that lithium carbonate particles having a size of 1 μm or smaller are perfectly dissolved and removed, and edges of lithium carbonate particles having a random surface shape are dissolved and rounded to provide lithium carbonate having a standardized particle shape.

If the carbonic acid gas is blown to the lithium carbonate slurry, it reacts with water to produce carbonic acid or bicarbonic acid ions, which react with lithium carbonate so as to produce liquid-phase lithium bicarbonate. As a result, dissolution of lithium carbonate is promoted. Since surface energy is high during the dissolution process, unstable particles, that is, minute particles and edges of the particles are dissolved earlier. As a result, remaining particles have a uniform size with a rounded shape.

The lithium carbonate particles having a particle size of 1 to 5 μm with a controlled particle shape are subjected to solid-liquid separation and washing to obtain high-purity lithium carbonate particles (step (g)).

The solid-liquid separation is performed using a centrifugal dehydrator, a filter press machine, or the like. Through the washing, purity of lithium carbonate is further improved. The washing is preferably performed by using a high-purity lithium carbonate saturation solution as washing water. Water may also be employed as cleaning water. However, since lithium carbonate is dissolved in water, a yield may be degraded.

The filtrate obtained from the solid-liquid separation contains sulfuric acid ions. According to the present invention, in order to remove sulfuric acid ions, sulfuric acid ions are deposited in the form of barium sulfate using soluble barium salts, and are subjected to solid-liquid separation to obtain high-purity barium sulfate (step (h)).

The amount of the soluble barium salt aqueous solution used in production of the barium sulfate is set to an equivalent weight 0.5 to 1.1 times of a total amount of sulfuric acid ions to be removed. If a dosage of the soluble barium salts is smaller than the equivalent weight 0.5 times of a total amount of sulfuric acid ions to be removed, a removal ratio of the sulfuric acid ions is reduced. If a dosage of the soluble barium salts is smaller than the equivalent weight 1.1 times of a total amount of sulfuric acid ions to be removed, barium remains as an impurity disadvantageously. The barium sulfate obtained from the solid-liquid separation process has high purity and may be commercially sold as a separate product after washing and drying.

The lithium carbonate produced on the basis of the method of producing high-purity lithium carbonate and barium sulfate from discarded lithium secondary batteries according to the present invention described above contains phosphor of 0.001 to 0.005 weight %, sulfur of 0.001 to 0.03 weight %, and sodium of 0.001 to 0.03 weight % as impurities and has an average particle size of 1 to 5 μm. In addition, the high-purity lithium carbonate particles have a uniform round particle shape. Furthermore, the barium sulfate produced on the basis of the method of producing high-purity lithium carbonate and barium sulfate from discarded lithium secondary batteries according to the present invention has high purity, and may be commercially sold as a product after washing advantageously.

EXAMPLES

<Example 1> Production and Purification of Lithium Phosphate from Discarded Lithium Secondary Battery Waste Liquid First, elements of a pouch type discarded lithium secondary battery were analyzed. As a result, a single battery has a total weight of 35.46 g, including a cover film of 0.51 g (1.4%), a plastic cap of 0.41 g (1.1%), a circuit board of 1.57 g (4.4%), and a battery module of 32.98 g (93%). In addition, it was analyzed that a powder layer coated on the surface of the battery has a weight of 1.98 g (5.6%) and contains iron (Fe) as a main component. The battery pouch was formed of aluminum and has a weight of 7.72 g (21.8%). It was found that corrosion is accelerated, and aluminum oxide is generated when the battery pouch is immersed in salt water. The battery internally includes a plastic separation film, an aluminum laminated film (cathode), a cathode active material, a copper laminated film (anode), and an anode active material. The plastic separation film has a weight of 1.05 g (2.96%), the aluminum laminated film has a weight of 3.26 g (9.2%), the cathode active material has a weight of 10.32 g (29.1%), the copper laminated film has a weight of 2.76 g (7.8%), and the anode active material has a weight of 5.96 g (16.8%).

<Example 1-1> Removal of Organic Substance from Discarded Lithium Secondary Battery Waste Liquid In this example, a lithium waste liquid of 1 ton generated in the process of recovering cobalt and nickel in recycling of the discarded lithium secondary battery was used. Elements of the lithium waste liquid and their pH values were analyzed. As a result, it was found that the lithium waste liquid has a pH value of 5 to 7, and the lithium waste liquid contains lithium ions ($Li^+$) of 2,990 ppm, sodium ($Na^+$) of 12,030 ppm, sulfuric acid ions ($SO_4^{2-}$) of 50,500 ppm, and organic substances of 130 ppm. In order to remove the organic substance from the lithium waste liquid, activated carbon was employed. This process was performed by passing the lithium waste liquid through an activated carbon absorption tower.

Figure 4:
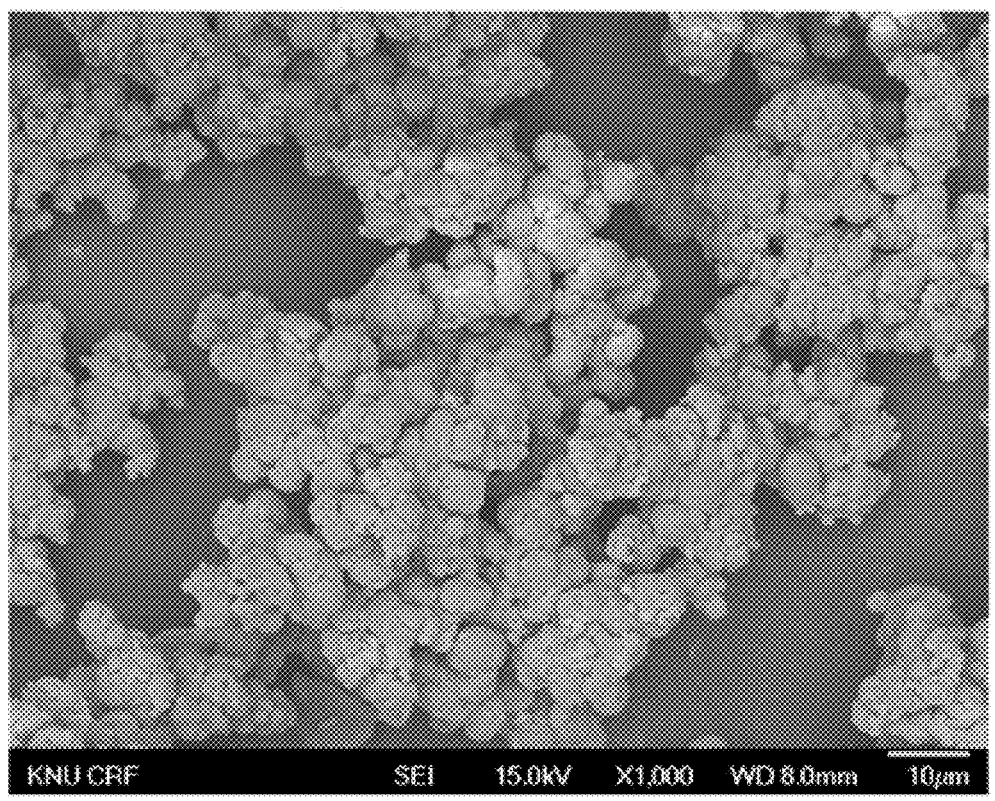
FIG. 4 is a SEM photograph of lithium phosphate produced from a discarded lithium secondary battery waste liquid.

<Example 1-2> Production of Lithium Phosphate from Discarded Lithium Secondary Battery Waste Liquid On the basis of the experimental examples of the present invention, it was possible to obtain an optimum condition for producing the lithium phosphate as described below. Specifically, the lithium ions and phosphoric acid ions were added to the discarded lithium secondary battery waste liquid by setting a ratio of the equivalent weights of the lithium ions and phosphoric acid ions to "1:2". NaOH was used as a pH conditioner to maintain the pH value equal to or higher than 13. A reaction temperature was set to 70° C., and a reaction time was set to 1 hour. By precipitating lithium phosphate under this reaction condition, it was possible to produce lithium phosphate having a particle size of 5 to 100 μm, a three-dimensional spherical shape, an improved specific surface area, and excellent reactivity (refer to FIG. 4).

A method of producing lithium phosphate from a discarded lithium secondary battery waste liquid is already known in the art as discussed in Korean Patent No. 10-1604954, assigned to the applicant.

The inventors sophisticated the prior art by applying the method of producing lithium phosphate described above as follows.

Any organic substance is removed by passing the discarded lithium secondary battery waste liquid through activated carbon.

A concentration of lithium ions contained in the discarded lithium secondary battery waste liquid obtained by removing the organic substance was measured. Then, soluble phosphate including $Na_3PO_4$, $Na_2HPO_4$, $NaH_2PO_4$, $K_3PO_4$, or $H_3PO_4$ or an aqueous solution of the soluble phosphate was added to the lithium waste liquid by an equivalent weight twice that of the lithium concentration of the lithium waste liquid (molar ratio was set to Li:$PO_4$=1:2).

A pH conditioner containing NaOH or KOH was added to maintain a pH value of 13 or higher, and the lithium and the phosphate were reacted at a temperature of 70° C. for 60 minutes. Then, solid-liquid separation was performed, and lithium phosphate was precipitated in a solid phase.

Since the liquid separated through the solid-liquid separation contains phosphoric acid, it is externally discharged after removing the phosphoric acid through an insoluble phosphate production process in which calcium hydroxide, a carbonic acid gas, and aluminum sulfate are reacted, and solid-liquid separation is then performed.

Water was added to the produced lithium phosphate (solids) as much as ten times a weight of the lithium phosphate, and an acid including $H_3PO_4$, $H_2CO_3$, $H_2SO_4$, $HNO_3$, or HCl or an aqueous solution of the acid was added, so that a matured lithium phosphate liquid having a pH value of 10 was produced. Then, the lithium phosphate was matured by agitating the liquid at the room temperature for 30 minutes or longer.

A lithium phosphate precipitation solution having a pH value of 13 was produced by adding a lithium hydroxide aqueous solution to the matured lithium phosphate liquid as much as an equivalent weight of the acid dosage. Then, high-purity lithium phosphate was precipitated by agitating the lithium phosphate precipitation solution at a temperature of 70° C. for 60 minutes or longer.

The precipitated lithium phosphate was subjected to washing and drying. As a result, high-purity lithium phosphate particles containing sodium and sulfur by 500 ppm or less and 100 ppm or less, respectively, as impurities and having a particle size of 5 to 100 μm and a three-dimensional spherical shape with an improved specific surface area was produced.

The liquid recovered through the solid-liquid separation performed after maturing of the lithium phosphate and through washing of the precipitated lithium phosphate and the solid-liquid separation is a phosphoric acid aqueous solution, which is also reused as the phosphoric acid aqueous solution added to the lithium waste liquid.

Figure 5A:
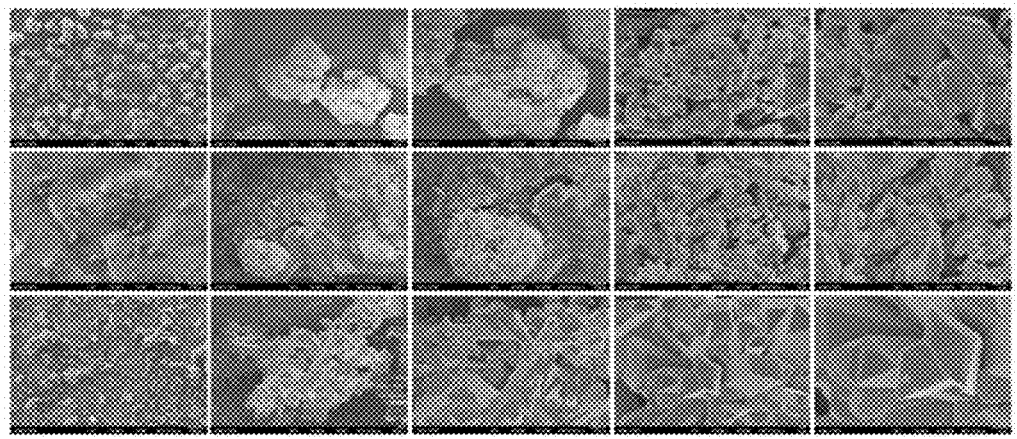
Figure 5B:
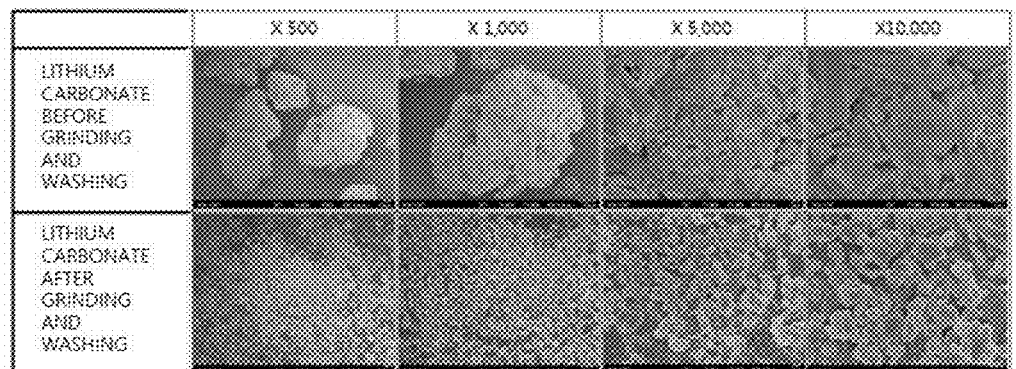
Figure 6A:
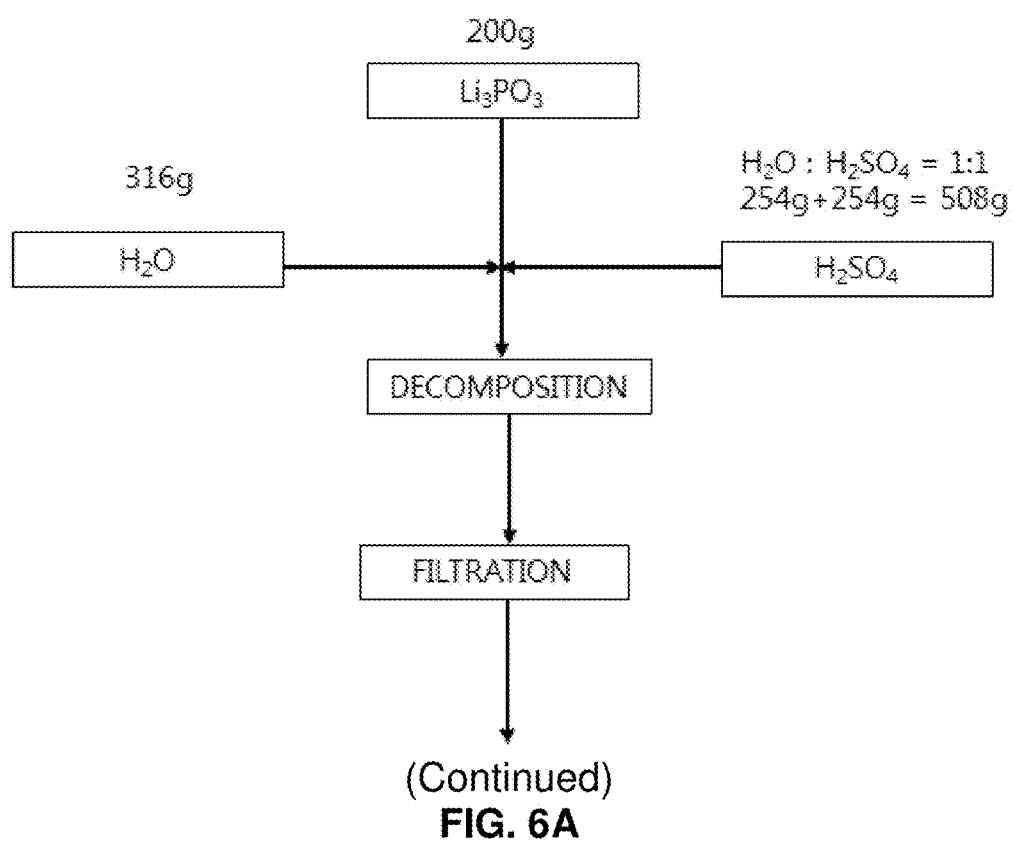
FIGS. 6A and 6B illustrates a process of producing lithium sulfate by decomposing lithium phosphate using sulfuric acid.
Figure 6B:
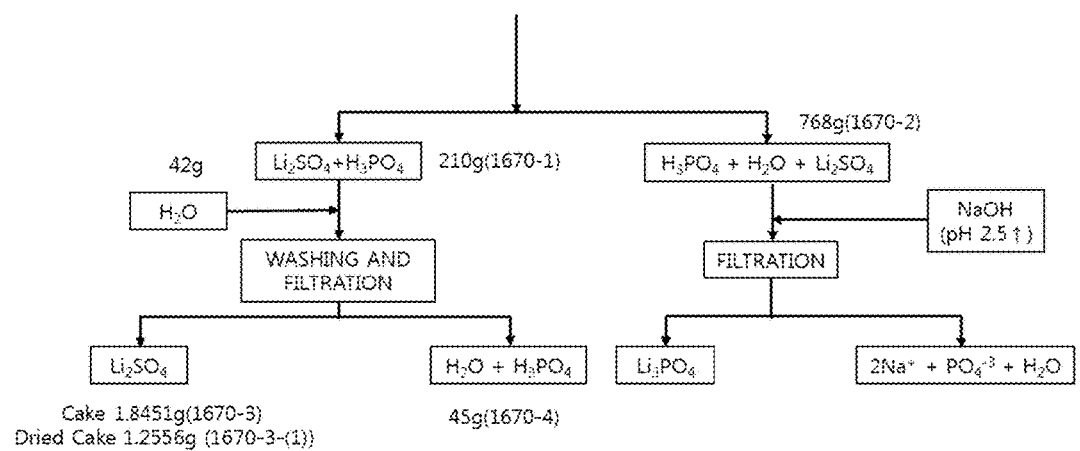

<Example 2> Production of Lithium Sulfate Using Lithium Phosphate Produced from Discarded Lithium Secondary Battery Waste Liquid 50% sulfuric acid of 508 g and distilled water of 316 g were mixed with the high-purity spherical lithium phosphate of 200 g produced from discarded lithium secondary batteries (lithium phosphate:sulfuric acid=1:1.2 parts by weight). Then, the mixture was reacted in a reaction chamber having a circulation cooler at a temperature of 30 to 50° C. for two hours. As a result, it was found that the lithium phosphate is decomposed into lithium sulfate ($Li_2SO_4$) and phosphoric acid ($H_2PO_4$) (refer to FIG. 5). Solid-liquid separation was performed to recover the produced lithium sulfate. The solubility of lithium sulfate is degraded if the lithium sulfate exists in the aqueous solution at a high concentration. Therefore, lithium sulfate was further obtained by condensing the filtrate obtained by removing again. As a result of the filtering, a filtrate of 45 g and pure lithium sulfate particles of 173 g were obtained (refer to FIG. 5).

A sample component analysis was performed for a sample of the lithium phosphate decomposition process using the lithium sulfate described above. As a result, it was analyzed that pure lithium sulfate can be obtained (refer to Table 1).

TABLE 1

Figure 1B:
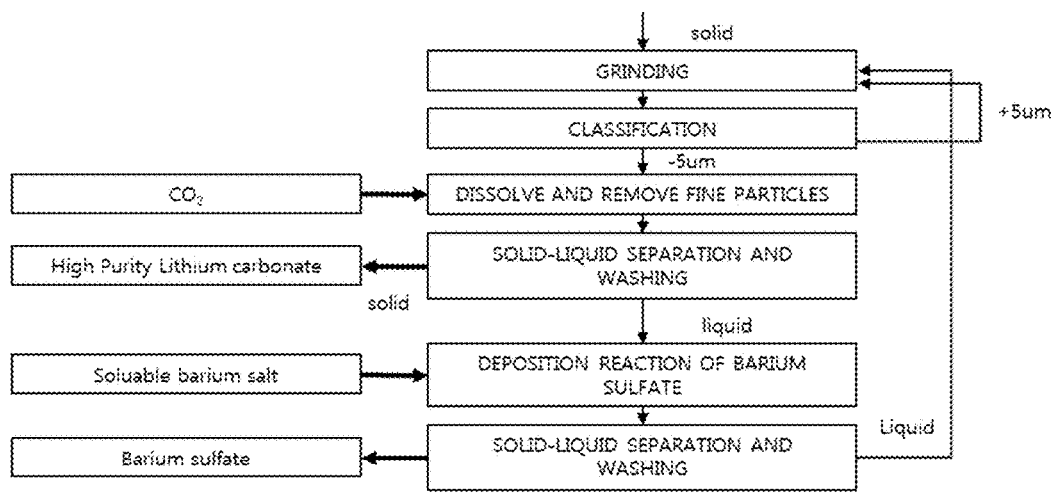
Figure 2A:
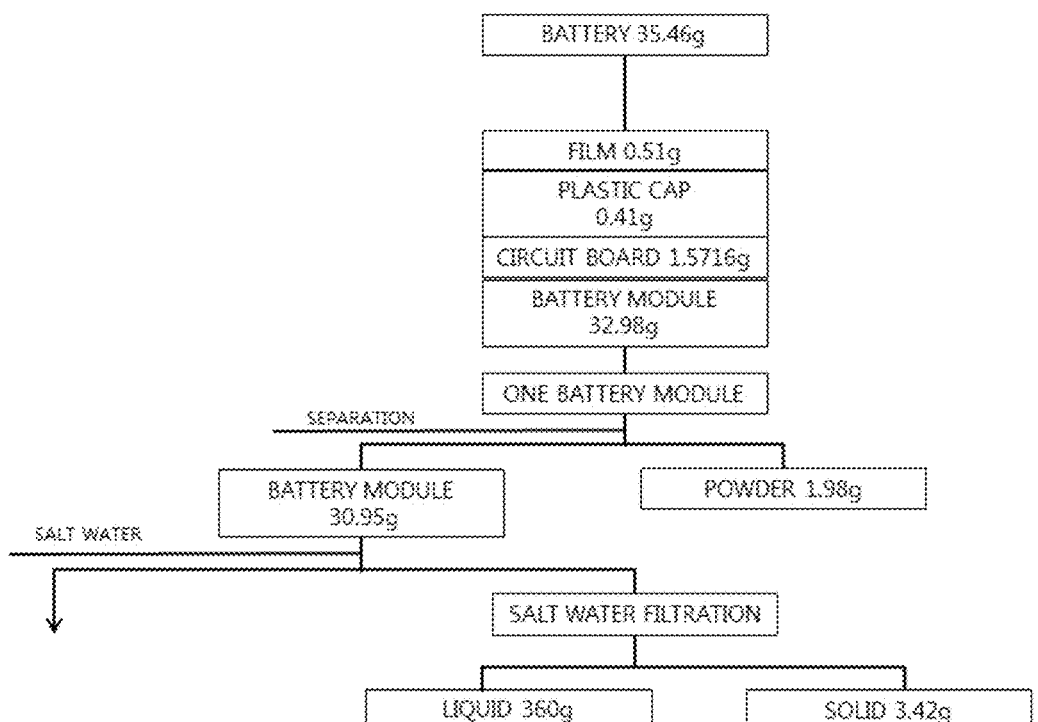
FIGS. 2A and 2B illustrates a sequence of decomposing a discarded lithium secondary battery along with compositions of substances.
Figure 2B:
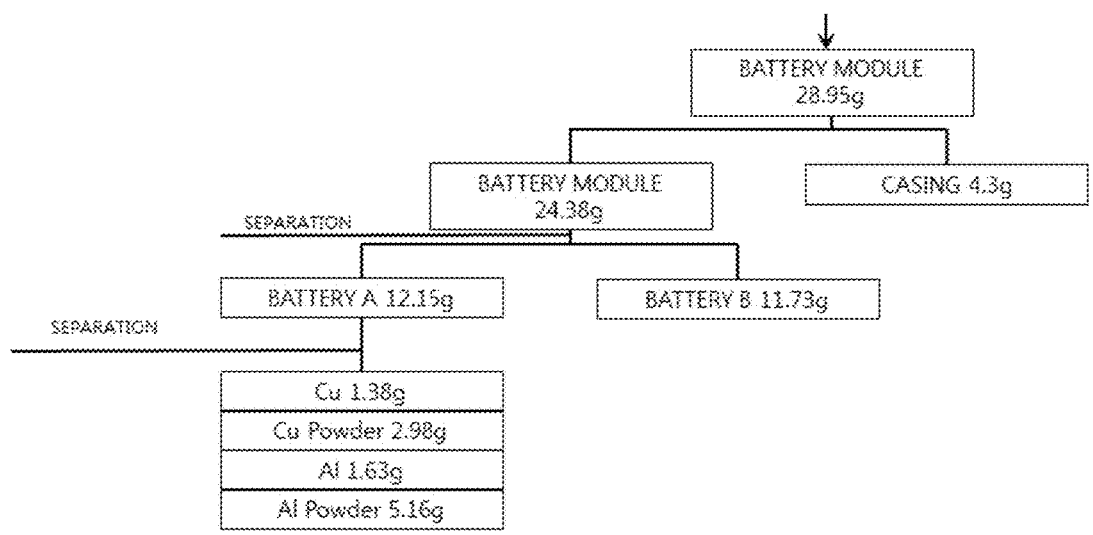
Figure 3A:
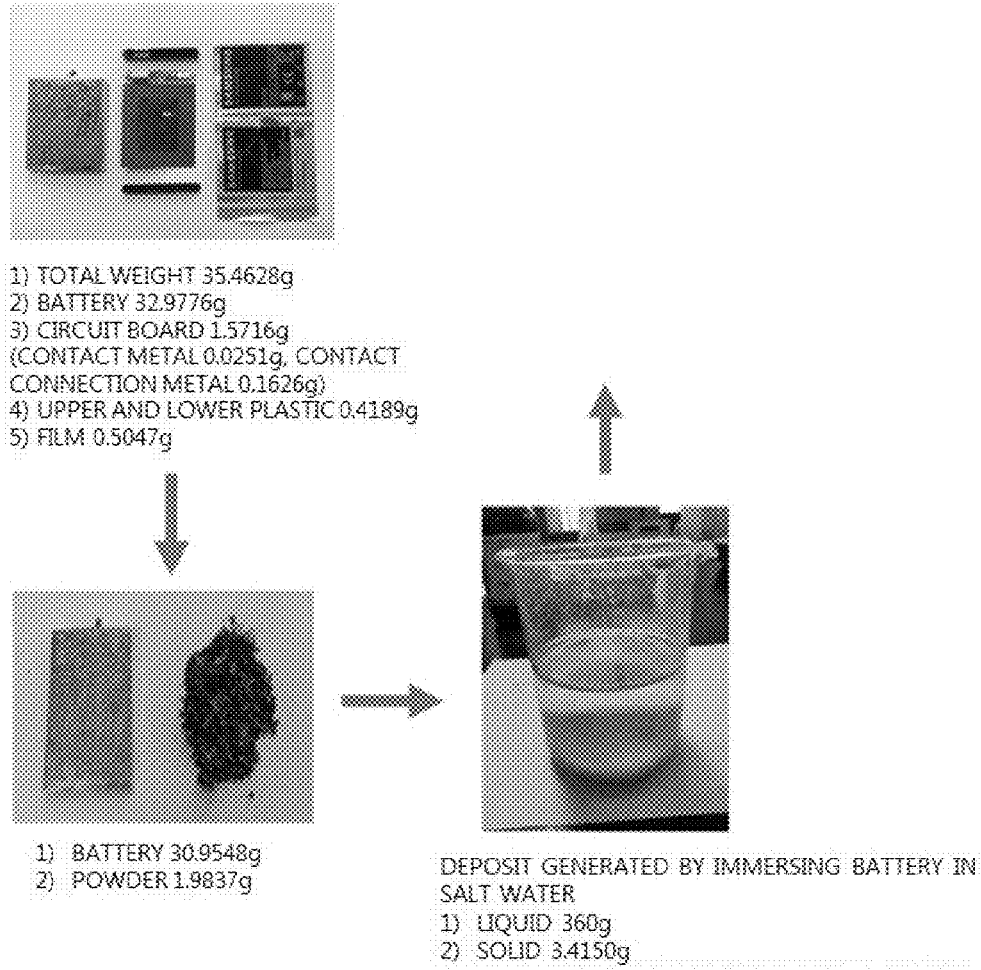
FIGS. 3A and 3B illustrates substances obtained by decomposing a discarded lithium secondary battery.
Figure 3B:
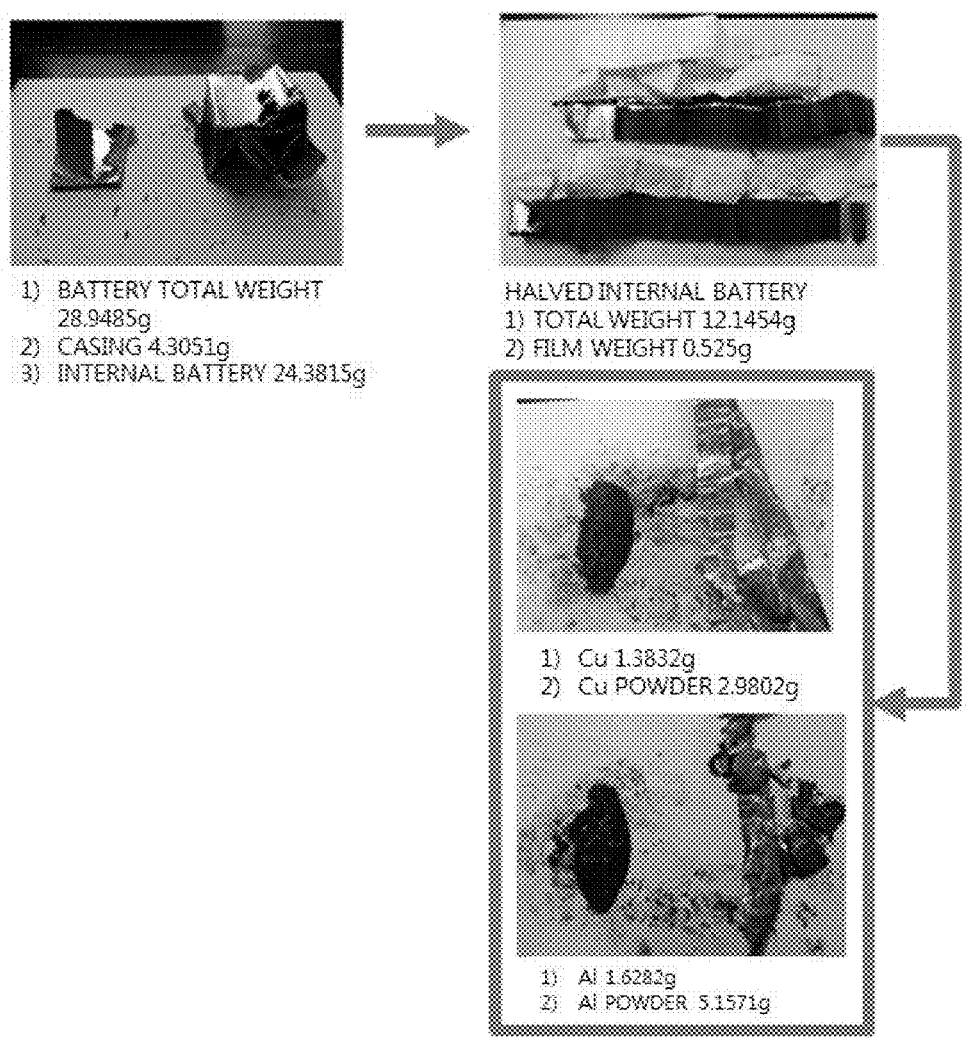

| Name | Weight (g) | Solution (mg/L) | | | Sample (mg/g) | | |
|---|---|---|---|---|---|---|---|
| | | $SO_4^{-2}$ | $PO_4^{-3}$ | Li | $SO_4^{-2}$ | $PO_4^{-3}$ | Li |
| Sample before decomposition of lithium phosphate using sulfuric acid | 2100.0 | 77696.0 | 351847.5 | 130840.3 | 41.0 | 185.8 | 69.1 |
| Sample (I) before decomposition of lithium phosphate using sulfuric acid | 86.0 | 627391.8 | 0.0 | 140264.9 | 579.2 | 0.0 | 129.5 |
| Sample (II) before decomposition of lithium phosphate using sulfuric acid | 76.0 | 796173.7 | 0.0 | 160120.1 | 774.8 | 0.0 | 155.8 | sediments (lithium sulfate) after the solid-liquid separation and performing the solid-liquid separation again. This condensation and solid-liquid separation process was repeated until lithium sulfate is not precipitated any more from the condensation of the separated liquid (filtrate). The condensation and solid-liquid separation process was repeated by five cycles, which was sufficient. If the lithium sulfate is not precipitated any more, this means that sulfuric acid is perfectly removed from the filtrate, so that phosphoric acid and lithium remain in the filtrate. The aqueous solution mainly contains phosphoric acid, which is a strong acid having a pH value of approximately 1 to 2. The pH value of the aqueous solution was raised to 2.5 or higher by using NaOH, and solid-liquid separation was then performed. As a result, lithium phosphate was deposited and separated as solids, and the phosphoric acid was separated as an aqueous solution. The lithium phosphate separated as solids was used as a material for producing lithium sulfate (refer to FIG. 1). A lithium sulfate recovery method well known in the art was employed, in which lithium sulfate is precipitated by heating and condensing the lithium sulfate aqueous solution. This lithium sulfate recovery method based on heating and condensation necessitates an expensive heating device and an expensive purification facility for treating the acidic vapor generated during condensation. This disadvantageously increases cost. According to the present invention, the condensation and the solid-liquid separation process is repeatedly performed. Therefore, such expensive facilities for heating and purification are not necessary. Accordingly, it is possible to reduce cost advantageously.

As a result of the condensation and solid-liquid separation process, a thin solution of phosphoric acid of 768 g containing impurities was recovered as a filtrate. NaOH was added to the phosphoric acid contained in this solution as much as the equivalent weight or more to set the pH value to 13 or higher. Then, the phosphoric acid was recycled as a source material of the lithium phosphate recovery process. The solid phase of the lithium sulfate has a weight of 210 g. This was washed with water of 42 ml and was filtered again. As a result of the filtering, a filtrate of 45 g was obtained. This was washed using water of 42 ml and was then filtered <Example 3> Production of Lithium Carbonate Using Lithium Sulfate Produced from Discarded Lithium Secondary Battery Waste Liquid Distilled water was added to the precipitated lithium sulfate particles, and agitation was performed at a temperature of 80° C. to obtain a lithium sulfate aqueous solution (500 ml). The lithium sulfate aqueous solution obtained by perfectly dissolving the lithium sulfate was used as a source material for producing lithium carbonate. The pH value was adjusted to 12 or higher by adding sodium hydroxide (NaOH) to the lithium sulfate aqueous solution (refer to FIG. 1). In the prior art, the pH value was adjusted using sodium carbonate. If the sodium carbonate is used as the pH conditioner, a liquid-liquid reaction occurs between the lithium sulfate aqueous solution and the sodium carbonate aqueous solution, and this generates flocs. In order to change the pH value of the lithium sulfate aqueous solution which is a strong acid (pH 2), into 12 to 13, an excessive amount of sodium carbonate is necessary. In this floc, non-removed impurities such as phosphoric acid as well as lithium carbonate produced through carbonation are also flocculated. Therefore, if the pH value is adjusted using sodium carbonate, it is difficult to remove the impurity during the carbonation process, or a yield of the lithium carbonate is degraded due to the floc disadvantageously.

In comparison, according to the present invention, sodium hydroxide (NaOH) is employed as the pH conditioner instead of the sodium carbonate. If the sodium hydroxide is used as the pH conditioner, no liquid-liquid reaction occurs, and no floc is formed. In addition, since the phosphoric acid serving as a main impurity in the pH variation is flocculated as lithium phosphate, the yield degradation of the lithium carbonate caused by the floc does not occur, and the phosphoric acid as an impurity is easily precipitated and separated as lithium phosphate. The lithium phosphate precipitated in this process is subjected to washing and is then recycled as high-purity lithium phosphate for producing lithium carbonate using lithium sulfate. The pH adjustment using the sodium hydroxide was performed to adjust the pH value of the lithium sulfate aqueous solution (pH 2) to a pH value of 12 to 13. If the lithium sulfate aqueous solution has a pH value of 12 to 13, the phosphoric acid contained in the aqueous solution is deposited as lithium phosphate in the carbonation process. In addition, a concentration of the lithium sulfate was adjusted to 0.3 M to 2.4 M, and reaction was performed at a temperature of 50° C. for 20 minutes to 2 hours. Then, solid-liquid separation was performed. As a result a lithium sulfate aqueous solution was obtained by removing the phosphoric acid component. In this case, the reaction rate and the reaction speed increase as the temperature increases. Therefore, a temperature of 80 to 100° C. is preferable. The lithium phosphate recovered through the solid-liquid separation was washed and then recycled as high-purity lithium phosphate for producing lithium sulfate.

A carbonation process was performed for the lithium sulfate aqueous solution in which a phosphor component was removed through filtration by using sodium carbonate ($Na_2CO_3$) or a carbonic acid gas ($CO_2$). Preferably, the carbonation process was performed using the carbonic acid gas ($CO_2$). A change of the pH value was observed while injecting the carbonic acid gas (at an injection rate of 300 to 1,000 ml/min) to the lithium sulfate aqueous solution having a controlled pH value (refer to Table 2).

TABLE 2

| | Injection time (min) | | | | | | |
|---|---|---|---|---|---|---|---|
| | 0 | 30 | 60 | 90 | 120 | 150 | 180 |
| Temperature (° C.) | 20 | 7.1 | 5.9 | 5.7 | 5.4 | 5.2 | 5.2 |
| pH | 11.19 | 8.26 | 7.82 | 7.66 | 7.44 | 7.38 | 7.38 |

As a result, it was observed that the pH value is reduced to 8.26 or lower after 30 minutes. A relationship between the carbonation and the pH value was analyzed, and it was found that the best carbonation efficiency was obtained at a pH value of 9 to 10. Therefore, it is preferable to perform the carbonation process by injecting the carbonic acid gas for 10 to 30 minutes. More preferably, the carbonation is performed by injecting the carbonic acid gas for 20 minutes.

In the carbonation process of the prior art, the pH adjustment and the carbonation were performed simultaneously by using sodium carbonate, and the carbonic acid gas was additionally used in order to improve carbonation efficiency. However, according to the present invention, in order to adjust the pH value, the lithium sulfate aqueous solution and the sodium hydroxide that does not generate a liquid-liquid reaction are employed, and the carbonation is then performed using the carbonic acid gas. Therefore, no floc is generated during the pH adjustment process, and phosphor as an impurity is deposited as lithium phosphate, which is then perfectly removed. Therefore, it is possible to produce a high-purity lithium sulfate aqueous solution and perform carbonation using this lithium sulfate aqueous solution. The lithium carbonate deposited through the carbonation process was recovered through filtration, and the filtrate was externally discharged (refer to FIGS. 1 and 5A). The components of the lithium carbonate produced through the carbonation process were analyzed. The result is shown in Table 3.

TABLE 3

| | Li | S | Na | P |
|---|---|---|---|---|
| lithium carbonate | 16.33% | 1.38% | 1.542% | 0.006% |

The external discharge operation is restrictively performed only when the content of the phosphoric acid in the course of the pH adjustment is equal to or smaller than 2 ppm. However, the content of the phosphoric acid in the filtrate may be equal to or larger than 2 ppm in some cases. Therefore, an insoluble phosphate production process was performed on the basis of a reaction between calcium hydroxide, a carbonic acid gas, and aluminum sulfate to adjust the content of phosphor to 2 ppm or smaller for purification, and the purified filtrate was discharged externally.

<Example 4> Improvement of Purity by Finely Grinding, Classifying, and Washing Lithium Carbonate Using Lithium Sulfate Produced from Discarded Lithium Secondary Battery Waste Liquid After the lithium phosphate was decomposed to sulfuric acid, carbonation was performed for the separated lithium sulfate to produce lithium carbonate. The produced lithium carbonate remains as an impurity because sulfuric acid ions and sodium ions are precipitated together during the carbonation process. According to the present invention, in order to produce high-purity lithium carbonate, grinding using an attrition mill and washing were applied as an impurity removal process (refer to FIG. 1).

The solid content concentration of the lithium carbonate slurry was set to 10% to 20%, and the aqueous solution used in production of the slurry was a lithium bicarbonate saturation solution. Sulfuric acid ions and sodium ions as an impurity captured in lithium carbonate crystals during the grinding process are escaped from crystals and are dispersed into the aqueous solution. In order to minimize absorption (maximize diffusion) of sulfuric acid ions and sodium ions during the grinding, the temperature of the slurry is set to 50 to 80° C., and the grinding bowl and the grinding media are preferably formed of a zirconia material in order to prevent contamination and improve grinding efficiency.

The produced lithium carbonate was put into an attrition mill and was grinded. Then, washing and filtering were performed. As a result, it was found that the contents of sodium (1.542%) and sulfuric acid (1.38%) are reduced to 0.137 to 0.18% and 0.22 to 0.298%, respectively, which is nearly ⅙. Washing and solid-liquid separation were additionally performed after the attrition mill grinding. Then, it was checked how much impurities are removed from the lithium carbonate. As a result, it was difficult to obtain a meaningful result (refer to Table 4).

TABLE 4

| | Li | S | Na | P |
|---|---|---|---|---|
| Lithium carbonate not subjected to attrition mill process | 16.33% | 1.38% | 1.542% | 0.006% |
| Lithium carbonate subjected to attrition mill process | 16.79% | 0.22% | 0.18% | 0.005% |
| Lithium carbonate subjected to additional washing after attrition mill process | 16.61% | 0.298% | 0.137% | 0.006% |

As a result of the attrition mill process, it was found that the impurities are removed, and the particle size is also reduced. If the particle size is reduced, a specific surface area of lithium carbonate is improved, and this advantageously results in improvement of reactivity (refer to FIG. 5A). The liquids generated through the attrition mill grinding, washing, and solid-liquid separation satisfied a reference phosphor level (equal to or lower than 2 ppm) for external discharge. However, there was a part of the filtrate not satisfying the reference phosphor level for external discharge. Therefore, the filtrate was externally discharged by removing the phosphoric acid through an insoluble phosphate production process in which calcium hydroxide, carbonic acid gas, and aluminum sulfate are reacted, and solid-liquid separation is performed.

Classification was performed for the lithium carbonate particles obtained through the fine grinding using a wet cyclone machine, a micro filter, or the like to obtain lithium carbonate particles having a size of 5 μm. The fine grinding was further performed for lithium carbonate particles having a particle size larger than 5 μm.

<Example 5> Control of Particle Size and Particle Shape of Lithium Carbonate Particles Subjected to Fine Grinding and Classification The lithium carbonate particles produced as described above have high purity because impurities are removed through fine grinding and classification and have an average particle size of 1 to 5 μm which provides improved reactivity. However, through the physical grinding process, fine lithium carbonate particles having a size of 1 μm or smaller (ultra-fine lithium carbonate particles) may be generated, and the lithium carbonate may have rough edges because the particle shape is not controlled. Such ultra-fine lithium carbonate particles induce heterogeneous flocculation of lithium carbonate particles and degrade the specific surface area disadvantageously. The lithium carbonate having an irregular particle shape has reactivity lower than that of the lithium carbonate having a particle shape controlled in a spherical shape. Therefore, a carbonation reaction was additionally performed for the ultra-fine lithium carbonate particles and the lithium carbonate particles having a non-controlled particle shape such that the ultra-fine lithium carbonate particles are dissolved and removed, and edges of the lithium carbonate particles having a non-controlled particle shape are partially dissolved to produce lithium carbonate having a particle shape controlled in a spherical shape.

This process was performed by blowing a carbonic acid gas to slurry containing lithium carbonate particles having a particle size of 1 to 5 μm. If the carbonic acid gas is blown to the lithium carbonate slurry, it reacts with water to produce carbonic acid or bicarbonic acid ions. These ions react with lithium carbonate to produce liquid-phase lithium bicarbonate. As a result, dissolution of lithium carbonate is promoted. Since surface energy is high during the dissolution process, unstable particles, that is, minute particles and edges of the particles are dissolved earlier. As a result, remaining particles have a uniform size with a rounded shape.

Solid-liquid separation using a centrifugal dehydrator, a filter press machine, or the like was performed for the slurry subjected to the carbonation. As a result, only lithium carbonate particles having a controlled particle size and a controlled particle shape were obtained. In this case, washing is indispensable in order to improve purity of the lithium carbonate as a commercial product. A high-purity lithium carbonate saturation solution is preferably employed as washing water. Pure water may also be employed. However, in this case, an yield is degraded due to dissolution.

<Example 6> Production of Barium Sulfate

A soluble barium salt aqueous solution was added to the filtrate generated in the solid-liquid separation for the slurry subjected to the carbonation process of Example 5 to deposit barium sulfate. Then, solid-liquid separation was further performed. The amount of the added soluble barium salt aqueous solution is preferably set to an equivalent weight 0.5 to 1.1 times of a total amount of the sulfuric acid ions to be removed. If the dosage of the barium salts is small, a removal ratio of sulfuric acid ions is reduced. If the dosage of barium salts is large, barium remains as an impurity disadvantageously. The barium sulfate obtained from the solid-liquid separation process has high purity, and may be commercially sold as a separate product after washing and drying.

<Experimental Example 1> Analysis for Production Condition of Lithium Carbonate

Deposition characteristics of lithium phosphate were analyzed to find an optimum experimental condition for producing lithium phosphate from a discarded lithium secondary battery waste liquid. The lithium phosphate is generated when lithium ions and phosphoric acid ions dissolved by a strong acid in discarded lithium secondary batteries are bonded. Therefore, influences of a concentration of the lithium chloride solution, a concentration of the sodium phosphate solution, and temperature on a property of lithium phosphate (sediment) generated by reacting a lithium chloride aqueous solution and a sodium phosphate aqueous solution were analyzed. Then, influences of temperature and time on the solubility of pure lithium phosphate were analyzed.

<Experimental Example 2> Influence of LiCl Solution Concentration on Property of Lithium Phosphate In reaction for depositing lithium phosphate by adding a lithium chloride (LiCl) aqueous solution to an aqueous solution of Na3PO4 of 0.2 M (333 ml), the concentration of lithium chloride aqueous solution was changed to 0.2 M (1000 ml), 0.4 M (500 ml), 0.8 M (250 ml), and 1.6 M (125 ml). The sodium phosphate aqueous solution was added by dropping at a rate of 50 ml/min while agitating the lithium chloride aqueous solution having a temperature of 20° C. at a revolution of 100 rpm. After the dropping, agitation was continuously performed for 60 minute, and the product was filtered. The product was dried at a temperature of 105° C. for 2 hours. Then, a weight was measured, and the particles were observed using an SEM.

As a result of the observation, no deposit was generated when lithium chloride of 0.2 M was dropped. In comparison, deposits of 5.69 g, 6.29 g, and 6.60 g were generated when lithium chlorides of 0.4 M, 0.8 M, and 1.6 M, respectively, were dropped. Considering lithium phosphate has solubility of 0.34 g/L, a weight of the product is estimated to 7.5 g. However, the weight of the sediment does not reach 7.5 g. This means that the reaction for generating lithium phosphate is very slow, or the reaction tends to keep maintaining the over-saturation state. It is conceived that this is because the solubility of lithium phosphate increases as the pH value of the reaction liquid is maintained at 13 or lower.

Therefore, according to the present invention, in order to maintain the pH value of the reaction liquid at 13 or higher, an NaOH aqueous solution of 0.6 M was added at a concentration of 167 ml/L.

Figure 7:
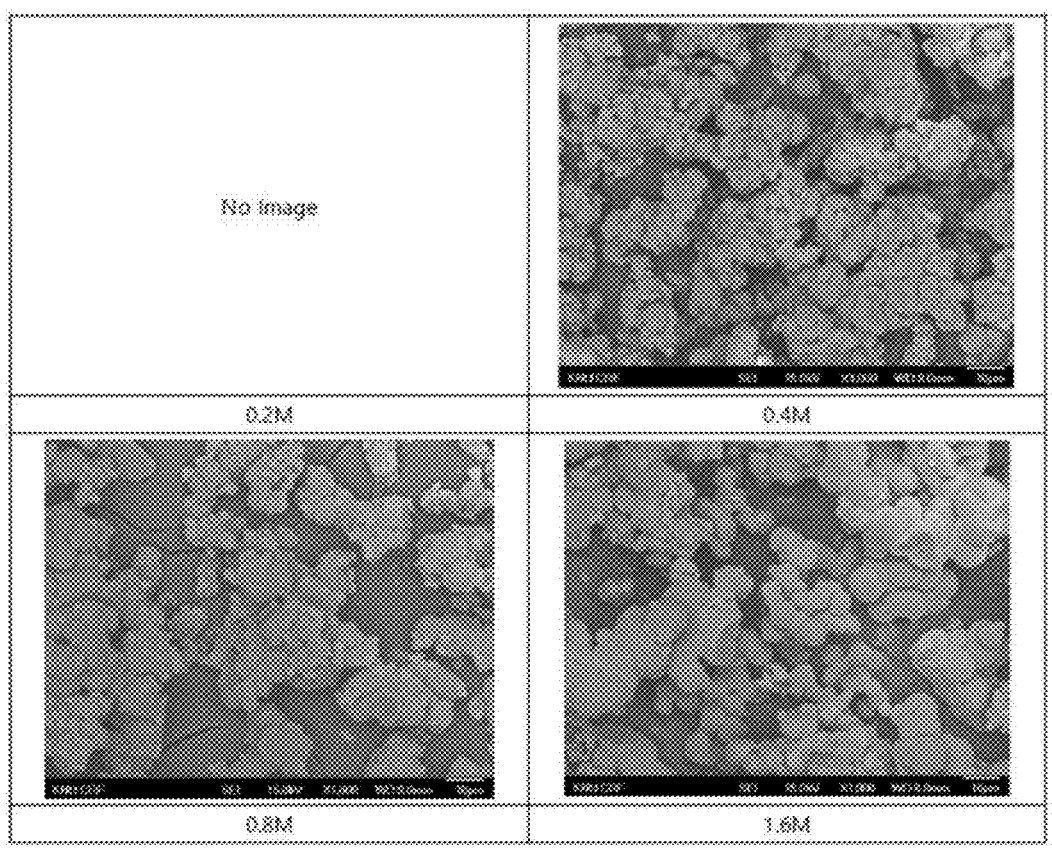
FIG. 7 is a series of SEM photographs of the produced lithium phosphate depending on a concentration of lithium ions.

In the lithium phosphate products, it was common that primary fine particles having a size of 0.01 μm are flocculated to form secondary particles of 0.1 to 0.5 μm, and the secondary particles are flocculated again to form polycrystalline particles of 2 to 10 μm. In addition, it was observed that the crystals are radially grown with respect to a crystalline nucleus in the center. As the concentration of lithium chloride increases, the particle shapes of the produced tertiary particles becomes close to a spherical shape (refer to FIG. 7).

<Experimental Example 3> Influence of Concentration of Na3PO4 Solution

A NaOH aqueous solution of 0.6 M (167 ml) was mixed with a LiCl solution of 0.4 M (500 ml). Then, a sodium phosphate aqueous solution was dropped to this solution to produce lithium phosphate. In this case, the concentration of the dropped $Na_3PO_4$ aqueous solution was changed to 0.1 M (667 ml), 0.2 M (333 ml), 0.4 M (167 ml), 0.8 M (84 ml). A sodium phosphate aqueous solution was dropped at a rate of 50 ml/min while agitating the lithium chloride aqueous solution having a temperature of 20° C. at a revolution of 100 rpm. After the dropping, agitation was continuously performed for 60 minutes, and the product was filtered. The product was dried at a temperature of 105° for 2 hours. Then, a weight of the product was measured, and particles of the product was observed using an SEM.

Figure 8:
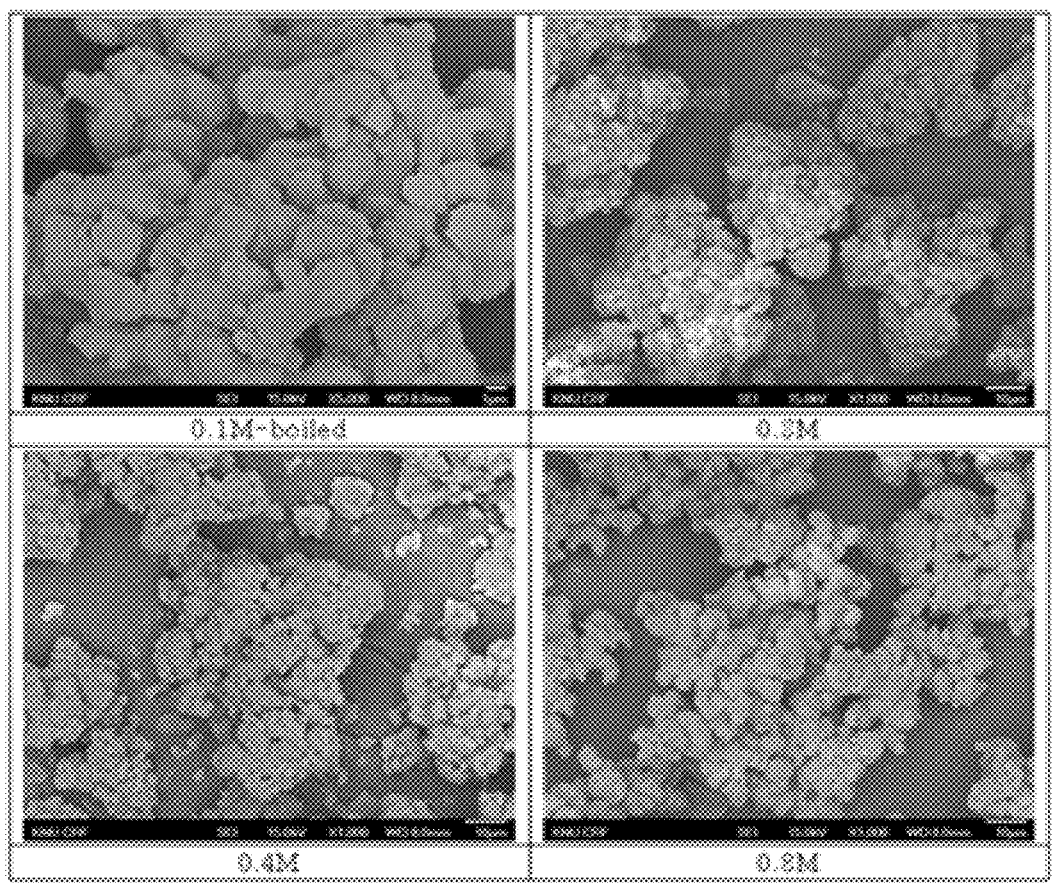
FIG. 8 is a series of SEM photographs of the produced lithium phosphate depending on a concentration of phosphoric acid ions.

In this case, the solution was heated because a deposit generation rate was too late at 0.1 M. As a result, as shown in FIG. 8, secondary particles having a size of 5 to 10 μm formed from primary columnar particles having a size of 1 to 5 μm were flocculated into crystals having a size of 10 to 100 μm. At a concentration equal to or higher than 0.2 M, primary fine particles having a size of 0.1 μm or smaller were flocculated to form an aggregate in which secondary and tertiary particles are not easily distinguished. The aggregate has a size 10 to 100 μm. In a case where the concentration was set to 0.8 M, primary fine particles having a size of 0.1 μm or smaller were flocculated to form secondary spherical particles having a size of 5 to 10 μm. It was observed that These secondary particles were flocculated to form tertiary particles having a size of 10 to 100 μm (refer to FIG. 8).

<Experimental Example 4> Influence of Reaction Temperature

Figure 9A:
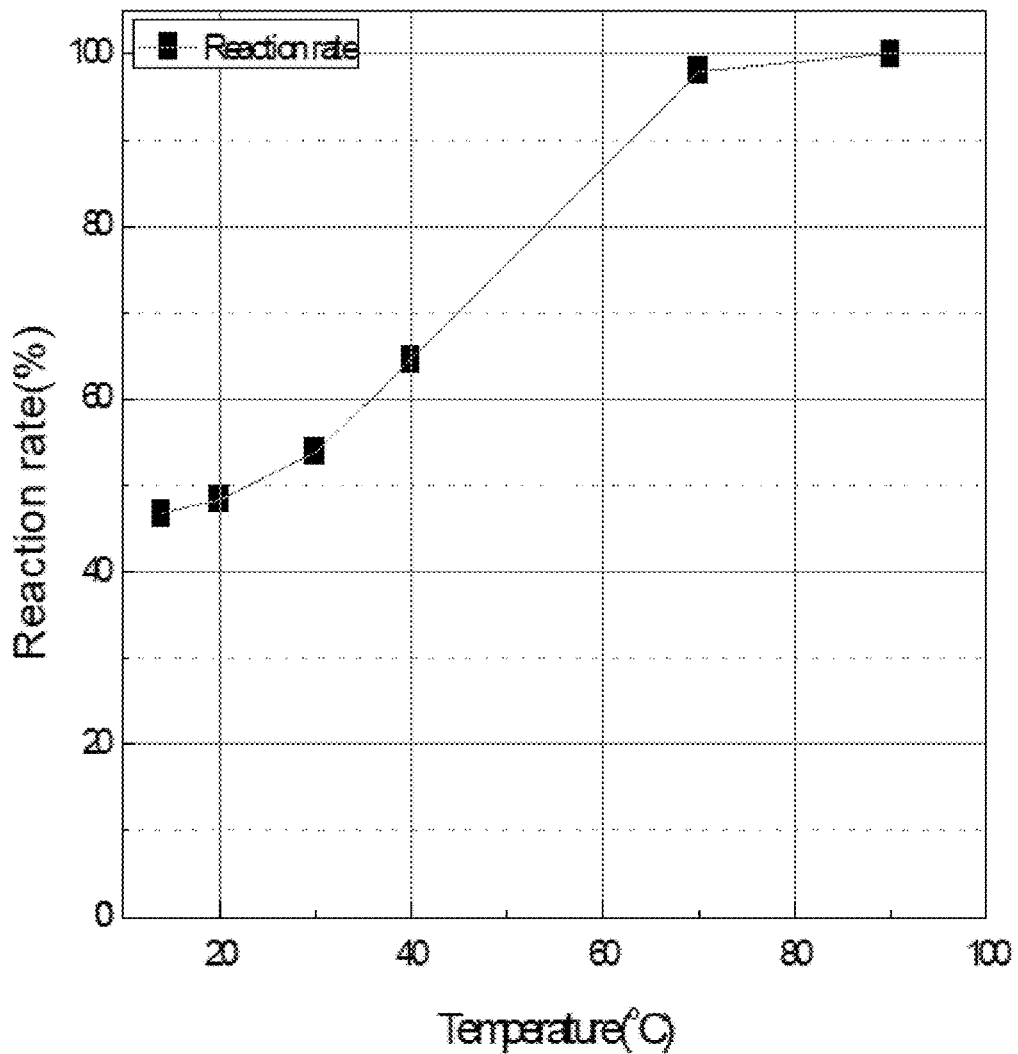
Figure 9B:
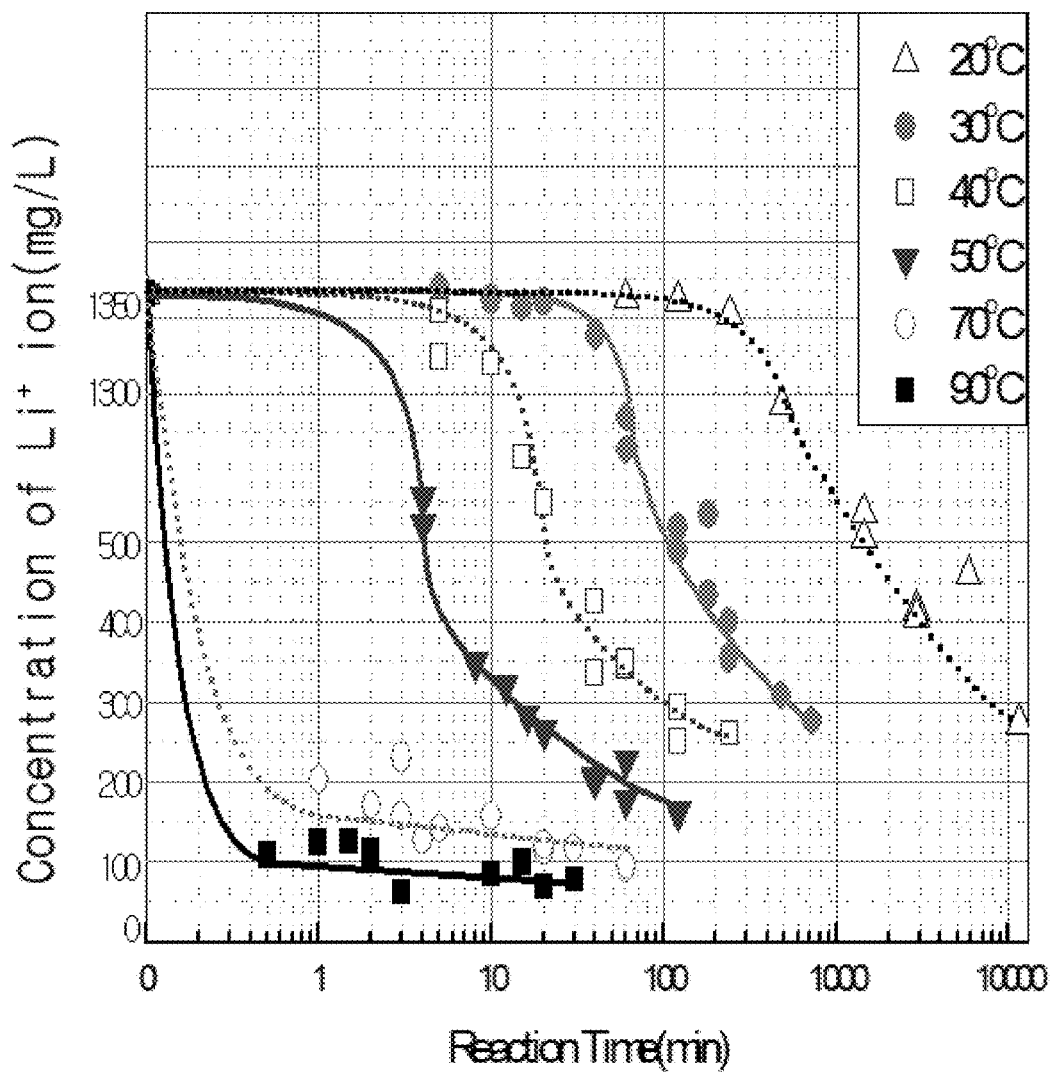

In a reaction of production a deposit of lithium phosphate by dropping a LiCl aqueous solution of 0.4 M (500 ml) to an aqueous solution obtained by mixing Na3PO4 of 0.2 M (333 ml) and a NaOH aqueous solution of 0.6 M (167 ml) at a rate of 50 ml/min, influence of the temperature was evaluated by changing the reaction temperature to 14° C., 20° C., 30° C., 40° C., 50° C., 70° C., and 90° C. FIG. 9A illustrates a relationship between a reaction rate calculated from the weight of the deposit produced after 1 hour and the temperature, and FIG. 9B is an SEM photograph of the deposit produced at each temperature.

It was observed that the reaction rates at temperatures of 14° C. and 20° C. are about 50%, which was low, and the reaction rate increases as the temperature increases. The reaction rate was 90% or higher at a temperature of 70° C. or higher. As a shape of the produced lithium phosphate, the primary fine particles having a size of 0.1 μm were flocculated at both the temperatures of 14° and 20° C. to form an aggregate in which the secondary and tertiary particles are not easily distinguished. The size of the particles was 10 to 100 μm. At a temperature of 30° C., it was observed that the primary particles have a size of 1 μm or larger, and the flocculation is reduced. Such a phenomenon becomes distinctive as the temperature increases. At a temperature of 90° C., cubic columnar crystals having a size of 5×10 μm and including only primary particles were grown (refer to FIG. 9B).

<Experimental Example 5> Reaction Rate Depending on Reaction Temperature

Figure 9C:
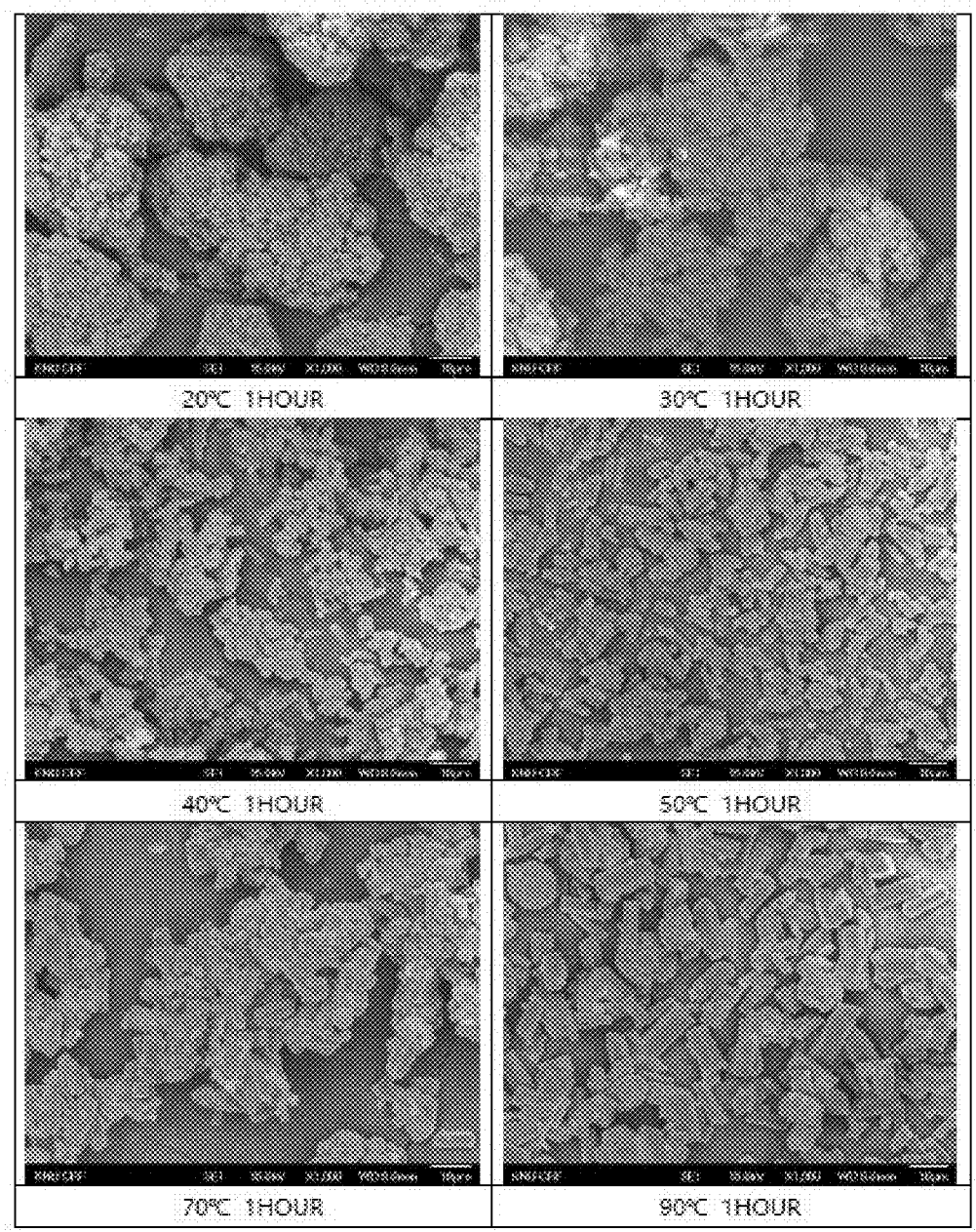

A mixed solution of a LiCl solution of 0.4 M (500 ml), a $Na_3PO_4$ solution of 0.2 M (333 ml), and a NaOH aqueous solution of 0.6 M (167 ml) was stored in two reaction chambers, and the temperature of each mixed solution was controlled to a reaction temperature. As both the mixed solutions have the reaction temperatures, the two solutions were mixed. Then, samples were taken at equal time intervals, and the Li concentrations of the samples were analyzed (refer to FIG. 9C).

$$3LiCl+Na_3PO_4 \rightarrow Li_3PO_4+3NaCl \quad \text{[Chemical Formula 5]}$$

In the aforementioned chemical formula 5, it is predicted that the reaction "LiCl (0.1M)+$Na_3PO_4$ (0.0333M)→$Li_3PO_4$ (0.033M)+NaCl (0.1M)" will generate a $Li_3PO_4$ deposit of 3.86 g (0.0333 M). However, since $Li_3PO_4$ has a solubility of 3.3×10$^{-3}$ M, the amount of the deposition that can be actually produced is 3.54 g. That is, a deposit of 3.54 g is produced, and the solution contains lithium ions ($Li^+$) of 68.7 ppm corresponding to 3.3×10$^{-3}$ mol/L.

A concentration of dissolved lithium ions at an initial stage of the reaction was 0.2 mol/L ($Li_3PO_4$), that is, 1388 mg/L (Li). However, it was observed that, as the reaction progresses, the concentration drastically decreases and finally reaches an equilibrium condition at 85 ppm which is slightly higher than the solubility of lithium phosphate (68.7 ppm). It was found that, as the reaction temperature decreases, a delay time for starting the reaction becomes longer. At a temperature of 30° C., the delay time was about 10 minutes (refer to FIG. 9C).

<Experimental Example 6> Lithium Recovery Percentage, Lithium Carbonate Purity, Energy Consumption, and Process Cost Analysis A lithium recovery percentage was evaluated through a field test. The recovery percentage was calculated on the basis of the following equation.

$$\text{Recovery}(\%) = \frac{C \cdot c}{F \cdot f} \times 100, \quad \text{[Equation 1]}$$

where "F" denotes a weight (kg) of the loaded sample, "f" denotes a grade of the metal contained in the loaded sample, "C" denotes a weight (kg) of a concentrate, and "c" denotes a grade of the metal contained in the concentrate. The grade of the sample was determined by a certificate authority in South Korea, and the analysis method was based on the Korean Standards KSD 1801 (analysis of iron and steel), KSM 0028 (spectroscopic analysis of emitted light), and KSD 1673 (inductively coupled plasma spectrometric analysis).

The lithium carbonate purity was evaluated on a field test basis. Chemical compositions of each sample were analyzed to calculate a grade of the desired metal. The sample analysis was made by a certificate authority in South Korea. The analysis method was based on the Korean Standards KSD 1801 (analysis of iron and steel), KSM 0028 (spectroscopic analysis of emitted light), and KSD 1673 (inductively coupled plasma spectrometric analysis).

Grade (%)={(amount of desired metal in sample)/ (total amount of sample)}×100     [Equation 2]

The energy consumption was measured using a watt-hour meter as a field test on the basis of the method specified in the Korean Standard KSB 8910:2012 in presence of an observer designated by the analysis certificate authority. The measurement result was verified by comparing the existing operation data.

The process cost was evaluated by an evaluator designated by the analysis certificate authority on the basis of the data (material resin) provided by an evaluatee and price information. It was difficult to acquire the process data regarding the method of producing lithium carbonate from the discarded lithium secondary battery waste liquid according to the present invention. Therefore, the process cost was calculated by referencing service quality management (SQM) data regarding a process of producing lithium carbonate from salt water.

The analysis results for the lithium recovery percentage, the lithium carbonate purity, the energy consumption, and the process cost calculated on the basis of the method according to the present invention were obtained as described in the following Table 5.

TABLE 5

| Main performance index | Unit | Current technology level | World best level (nation/enterprise) | Evaluation result |
|---|---|---|---|---|
| 1. lithium recovery percentage | % | 50 | equal to or higher than 60 (SQM/chile) | 91.9 |
| 2. lithium carbonate purity | % | 95 | equal to or higher than 99 (SQM/chile) | 99.5 |
| 3. energy consumption | kwh/ton (lithium carbonate) | 20,000 | equal to or lower than 2,000 (SQM/chile) | 1,980 |
| 4. process cost | $1/ton (lithium carbonate) | 5,000 | equal to or higher than 2,500 (SQM/chile) | 1,479 |

Evaluation Result

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. A method of producing high-purity lithium carbonate and barium sulfate from discarded lithium secondary batteries, the method comprising:
(I) providing high-purity lithium phosphate from a discarded lithium secondary battery; and
(II) producing high-purity lithium sulfate from the high-purity lithium phosphate and producing high-purity lithium carbonate and barium sulfate from the high-purity lithium sulfate,
wherein step (II) comprises
(a) mixing high-purity lithium phosphate from step (I) and a sulfuric acid aqueous solution to produce a liquid mixture,
(b) condensing the liquid mixture of step (a) and performing solid-liquid separation on the liquid mixture to obtain high purity lithium sulfate solid,
(c) dissolving the high-purity lithium sulfate solid in water or a sodium hydroxide aqueous solution having a pH value of 12 or higher, and performing solid-liquid separation to obtain a lithium sulfate aqueous solution and a solid-phase lithium phosphate,
(d) adding carbonate, carbonate aqueous solution, or a carbonic acid gas to the lithium sulfate aqueous solution and performing solid-liquid separation to obtain solid-phase lithium carbonate,
(e) finely grinding the solid-phase lithium carbonate and classifying lithium carbonate particles having a particle size of 1 to 5 μm to produce lithium carbonate slurry,
(f) blowing a carbonic acid gas to the lithium carbonate slurry and dissolving edges of lithium carbonate particles or dissolving and removing minute particles of the lithium carbonate,
(g) performing solid-liquid separation for the lithium carbonate slurry obtained by step (f) to obtain high-purity lithium carbonate having a solid phase, and
(h) adding a soluble barium salt aqueous solution to a filtrate obtained from the solid-liquid separation of step (g) and performing solid-liquid separation to obtain high-purity barium sulfate having a solid phase,
wherein the solid-phase lithium phosphate obtained through the solid-liquid separation of step (c) is used as the liquid mixture of lithium phosphate and sulfuric acid of step (a),
wherein the lithium carbonate particles having a size larger than 5 μm in the classification of step (e) are additionally grinded until the particle size becomes 1 to 5 μm, and
wherein the filtrate of step (h), which is formed after performing solid-liquid separation to obtain high purity barium sulfate having a solid phase, is added to the fine grinding of step (e).

2. The method according to claim 1, wherein step (I) comprises
(i) passing discarded lithium secondary battery waste liquid through activated carbon to remove organic substances,
(j) measuring a concentration of lithium ions contained in the discarded lithium secondary battery waste liquid from step (i) and adding soluble phosphate at an equivalent weight twice the lithium concentration of the lithium waste liquid to produce a lithium phosphate waste liquid,
(k) adding a pH conditioner to the phosphate-lithium waste liquid to maintain a pH value at 13 or higher, generating reaction at a temperature of 70° C. for 60 minutes, and performing solid-liquid separation to produce low-purity lithium phosphate precipitated as a solid phase,
(l) adding water of 10 parts by weight to the low-purity lithium phosphate and adding acid to produce a matured lithium phosphate liquid having a pH value of 10,
(m) agitating the matured lithium phosphate liquid at room temperature for 30 minutes or longer to mature the lithium phosphate,
(n) adding a lithium hydroxide aqueous solution to the matured lithium phosphate liquid at an equivalent weight of the acid dosage to produce a lithium phosphate precipitation solution having a pH value of 13, and (o) agitating the lithium phosphate precipitation solution at a temperature of 70° C. for 60 minutes or longer to obtain high-purity lithium phosphate.

3. The method according to claim 1, wherein the dissolving step (c) is performed at a temperature of 50 to 90° C. for 20 to 120 minutes and a concentration of the lithium sulfate aqueous solution is 0.3 to 2.4 M.

4. The method according to claim 1, wherein step (d) is performed at a temperature of 30° C. or higher for 20 minutes to 2 hours, concentration of lithium sulfate of the lithium sulfate aqueous solution is 0.3 to 2.4 M and adding sodium carbonate or sodium hydroxide and a carbonic acid gas at an equivalent weight to the lithium sulfate.

5. The method according to claim 1, wherein step (h) further comprises mixing soluble barium salts in the soluble barium salt aqueous solution at an equivalent weight 0.5 to 1.1 times of a total amount of sulfuric acid ions contained in the filtrate obtained from the solid-liquid separation of step (g).

6. The method according to claim 1, wherein phosphor, sulfur, and sodium are present at 0.001 to 0.005 weight %, 0.001 to 0.03 weight %, and 0.001 to 0.03 weight %, respectively, and the high-purity lithium carbonate has an average particle size of 1 to 5 μm.

7. The method according to claim 1, wherein 85% to 95% of lithium is recovered from the discarded lithium secondary battery, and the produced lithium carbonate has a purity of 98% to 99.9%.

8. The method according to claim 1, wherein the filtrate of step (b), which is the filtrate of the solid-liquid separation, is mixed with sodium hydroxide to provide a mixture used in providing high-purity lithium phosphate.

9. The method according to claim 2, wherein the soluble phosphate of step (j) is selected from the group consisting of $Na_3PO_4$, $Na_2HPO_4$, $NaH_2PO_4$, $K_3PO_4$, $H_3PO_4$, and an aqueous solution of the soluble phosphate.

10. The method according to claim 2, wherein the pH conditioner of step (k) is NaOH or KOH.

11. The method according to claim 2, wherein the acid of step (l) is selected from the group consisting of $HPO_4$, $H_2CO_3$, $H_2SO_4$, $HNO_3$, HCl, and an aqueous solution thereof.

* * * * *